(12) United States Patent
Tanaka

(10) Patent No.: US 6,900,906 B1
(45) Date of Patent: May 31, 2005

(54) APPARATUS, METHOD AND COMPUTER READABLE RECORDING MEDIUM FOR PROCESSING IMAGE INFORMATION

(75) Inventor: Tomonori Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 768 days.

(21) Appl. No.: 09/668,161

(22) Filed: Sep. 25, 2000

(30) Foreign Application Priority Data

Sep. 24, 1999 (JP) ............................................. 11-271330
Sep. 19, 2000 (JP) ........................................ 2000-284293

(51) Int. Cl.⁷ ......................... G06F 15/00; G06F 12/00; G06F 13/00; H04N 1/40

(52) U.S. Cl. ..................... 358/1.16; 358/1.14; 358/1.15; 358/404; 358/444; 358/426.05; 711/150; 711/148; 710/51; 710/52; 710/53

(58) Field of Search ............................... 358/1.14, 1.15, 358/1.16, 404, 426.05, 444; 711/111, 150–152, 163, 148; 710/52–57

(56) References Cited

U.S. PATENT DOCUMENTS

| | | | | |
|---|---|---|---|---|
| 5,710,638 A | * | 1/1998 | Yamamoto et al. | ......... 358/404 |
| 6,067,408 A | * | 5/2000 | Runaldue et al. | ........... 710/307 |
| 6,128,094 A | * | 10/2000 | Smith | ......................... 358/1.15 |
| 6,345,345 B1 | * | 2/2002 | Yu et al. | ...................... 711/151 |
| 6,449,056 B1 | * | 9/2002 | Mishima et al. | ........... 358/1.16 |
| 6,621,592 B1 | * | 9/2003 | Takayama et al. | .......... 358/1.16 |

FOREIGN PATENT DOCUMENTS

JP            6-168183          6/1994

* cited by examiner

*Primary Examiner*—Edward Coles
*Assistant Examiner*—Chan S. Park

(74) *Attorney, Agent, or Firm*—Oblon, Spivak, McClelland, Maier & Neustadt, P.C.

(57) ABSTRACT

An image processing apparatus, method and computer readable recording medium provided with a primary memory device and a secondary memory device both having image data memorized therein, in which said image data are input to said primary memory device, and including an external input data amount acquisition device acquiring the amount of said image data input to said primary memory device; an internal output data amount acquisition device acquiring the amount of said image data output from said primary memory device and input to said secondary memory device; a first difference data amount calculation device subtracting the amount of the data acquired by said internal output data amount acquisition device from the amount of the data acquired by said external input data amount acquisition device, and calculating first difference data amount by the subtraction; a memory access control device practicing the inputting and outputting of said image data with time sharing in said primary memory device, comparing said first difference data amount with a first value and a second value larger than said first value, stopping the processing of outputting said image data from said primary memory device to said secondary memory device when said first difference data amount reaches the value equal to or smaller than said first value, and starting again the processing of outputting said image data from said primary memory device to said secondary memory device when said first difference data amount reaches the value equal to or larger than said second value; and an error signal outputting device comparing said first difference data amount with a third value larger than said second value and a fourth value smaller than said first value, and outputting an error signal when said first difference data amount reaches the value equal to or larger than said third value or when said first difference data amount reaches the value equal to or smaller than said fourth value.

65 Claims, 20 Drawing Sheets

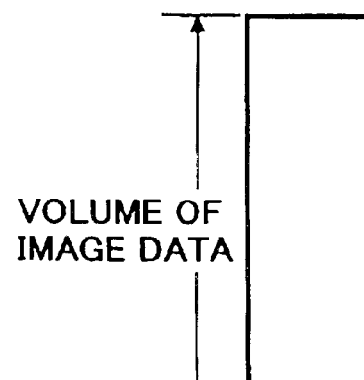
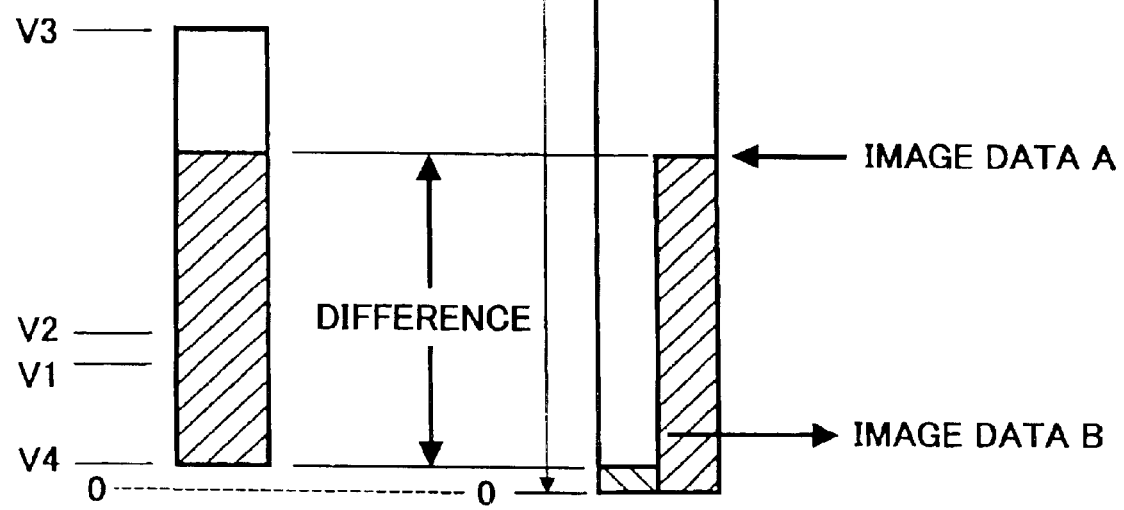

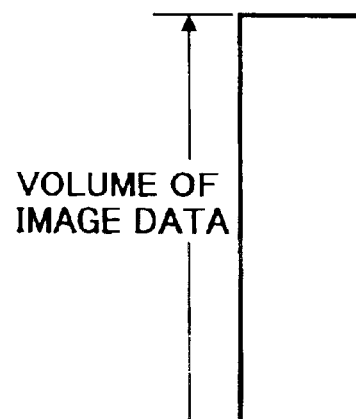
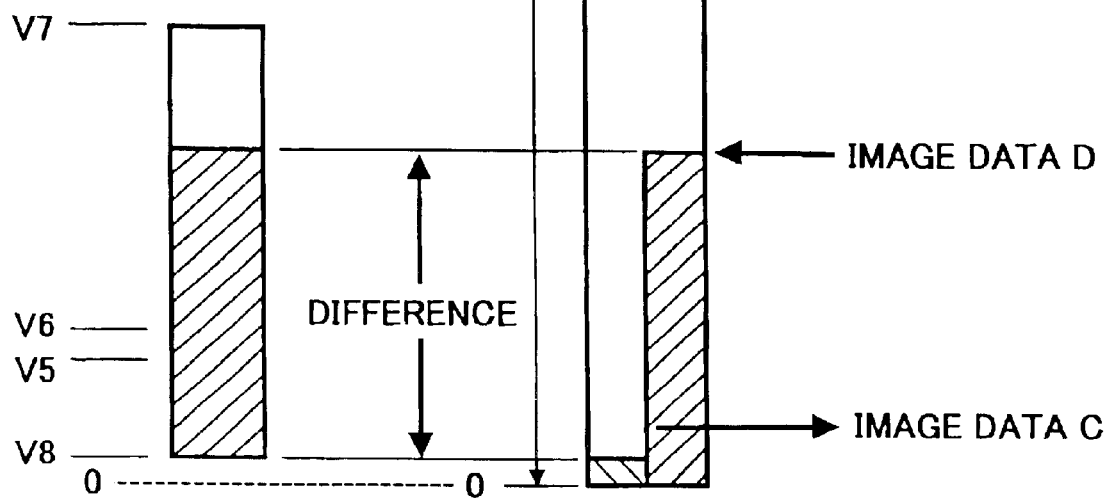

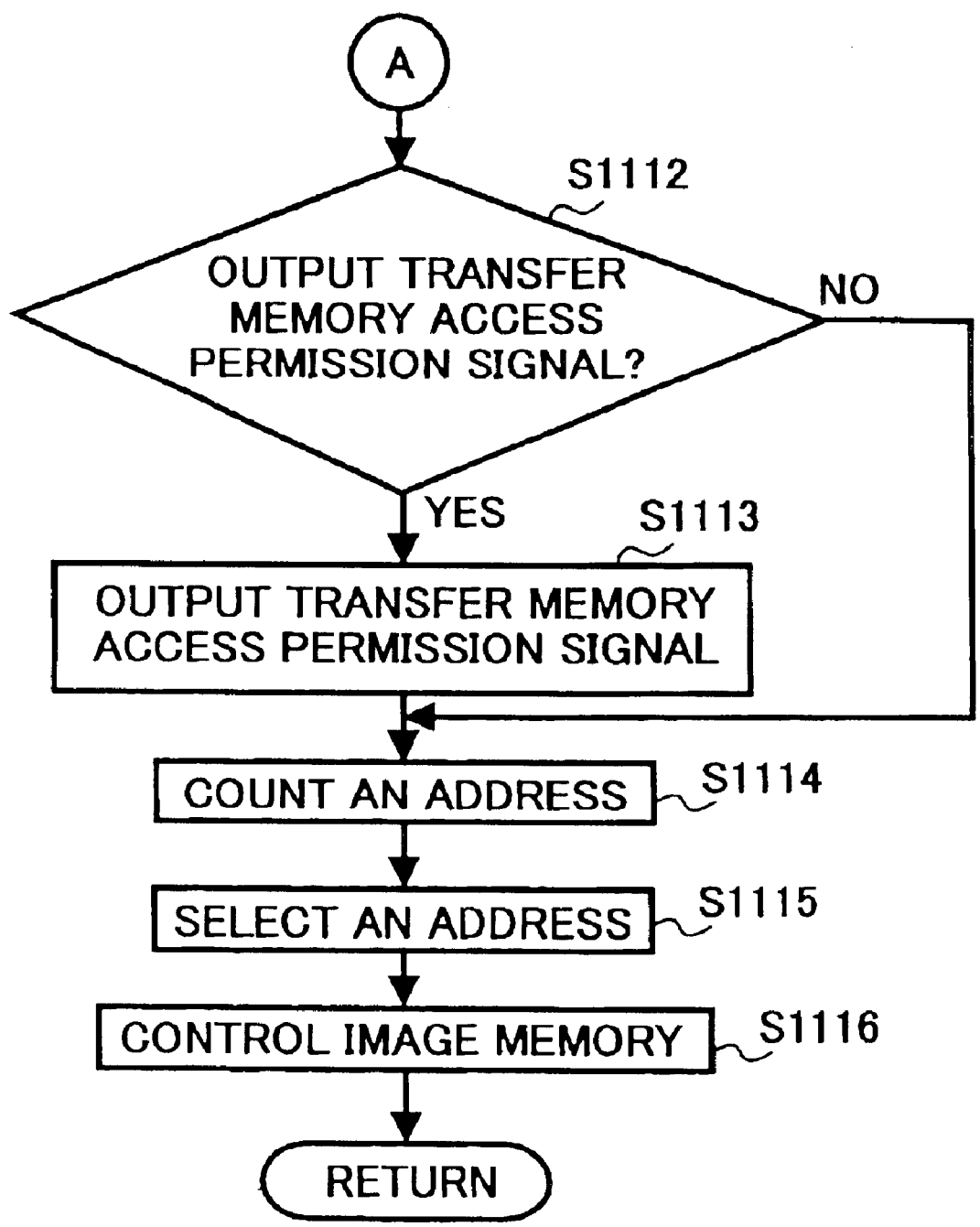

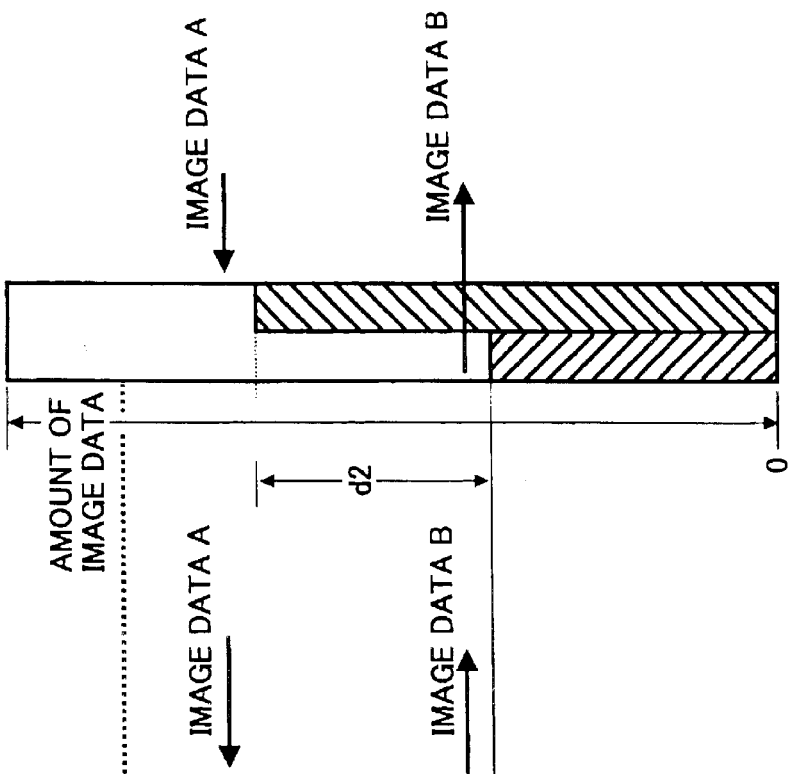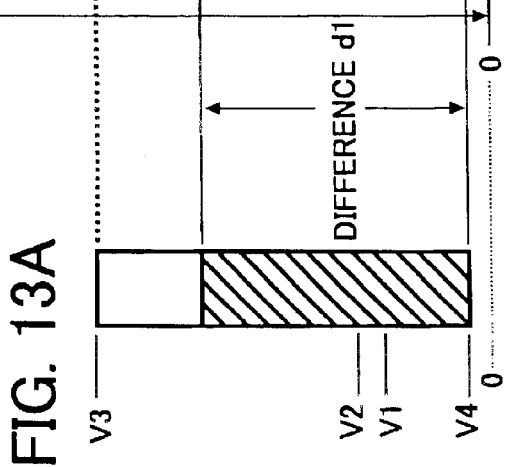

MAIN SCANNING DIRECTION →

1 LINE LENGTH

Ps

SUB-SCANNING DIRECTION

O

X

Ps

Y

Q    P

APPARATUS, METHOD AND COMPUTER READABLE RECORDING MEDIUM FOR PROCESSING IMAGE INFORMATION

BACKGROUND OF THE INVENTION

1. Field of the Invention

The present invention relates to an apparatus, method and computer readable recording medium for performing a digital processing of image information, and more particularly to an apparatus, method and computer readable recording medium for performing a digital processing of image information with a memory control system.

2. Discussion of the Background

With a advancement of a digitalization of an image processing apparatus, such as a copying machine and so forth, processing and editing of image data using an image memory to store image data has become popular. Exemplary devices for processing and editing image data include an electronic sorter device and an image division device. An electronic sorter device memorizes image data of a plurality of original documents in an image memory, and outputs a designated number of copies. The electronic sorter device eliminates the sorting of the copies and produces a plurality of batches of copies of the original documents.

In order to achieve an electronic sort function, a copying apparatus is required to memorize all image data of a plurality of original documents in an image memory. A copying apparatus includes a semiconductor memory as a primary memory device (i.e., a main memory device) which is attached to a CPU (Central Processing Unit). However, because a semiconductor memory is comparatively expensive, a copying apparatus generally includes a secondary memory device (i.e., a supplementary memory device), which supplements a memory capacity of the primary memory device. The copying apparatus uses both primary and secondary memory devices as an image memory. A secondary memory device includes a disk recording medium, such as a hard disk and a MO (magneto-optical disk), which are comparatively cheaper than a semiconductor memory.

A semiconductor memory is used as a buffer memory to absorb a difference between a transfer speed of image data of a secondary memory device and an input/output speed of image data of a copying apparatus. A semiconductor memory is also used to output an image formed according to image data by rotating the image with an address operation during reading out of image data stored in a secondary memory device (i.e., an image rotation function). When an image data transfer speed of a secondary memory device is substantially high compared with an image data input/output speed of a copying apparatus, an input/output image data can be directly stored in a secondary memory device. In this way, such above-noted semiconductor memory is not required. Similarly, when a copying apparatus does not have an image rotation function, such above-noted semiconductor memory is also not required.

In a secondary memory device, data is sequentially stored. When the stored data is randomly read out so as to rotate an image, access speed is substantially lowered such that a speed of an image output, which a copying apparatus may require, may not be satisfied. For example, the invention described in Japanese Patent Laid-Open Publication No. 6-168183 includes a semiconductor memory with a correspondingly smaller memory capacity by controlling an image memory according to processing and editing functions. An apparatus according to the above-mentioned invention includes a table to control a property of each semiconductor memory, which is a frame buffer memory, and a function to temporarily store data, which is stored in a semiconductor memory, in a secondary memory device.

According to the above-noted invention, when a frame buffer memory size larger than a remainder of a frame buffer memory size is required, data stored in a semiconductor memory is temporarily stored in a secondary memory device referring to a property of a semiconductor memory in a table so as to secure a frame buffer memory size necessary for a new job. A status of a job is described in the table, and whether or not data stored in a semiconductor can be temporarily stored in a secondary memory device is judged by the status.

An image division device outputs a plurality of images by dividing image data of an original document, which has been read out by being scanned once by a scanner, into a plurality of images. The processing of an image division is performed by repeating operations in which an image data read out from an original document is temporarily stored in a semiconductor memory, the stored data is read out with an address designated and is output to a printer at the same time.

Based on the above discussion, a digital copying machine having an electronic sort function is often configured to include both a semiconductor memory and a secondary memory device and the capacity of such a semiconductor memory typically equals the amount of data corresponding to the largest possible transfer sheet output by the copying machine. However, even if a semiconductor memory has a memory capacity that can store data of the largest possible output transfer sheet, it is very rare to execute an image rotation for a size of the largest possible output transfer sheet. Further, when a secondary memory device has an access speed that is very much close to an image transfer speed corresponding to a copy speed of a copying machine, it absorbs a speed difference, thereby eliminating a need of a semiconductor memory.

According to the above-noted devices, whether or not data can be temporarily stored in a secondary memory device is judged by comparing a size of a memory. Practically, it is sufficient to have a memory size in which transferred data is temporarily stored until it is output. However, because such devices compare an absolute volume of a memory size, a memory used tends to be larger in a storage capacity so as to secure a larger memory size.

In an image dividing device, image data read out by a single scan is required to be temporarily stored. However, current image dividing functions typically can not be applied to image data stored in a memory device other than a main memory device attached to a CPU. Therefore, a copying apparatus needs to include a semiconductor memory that is large enough to store image data of the largest original document, which a scanner can scan in a single scan. This makes it difficult to downsize a semiconductor memory to be used.

SUMMARY OF THE INVENTION

The present invention has been made in view of the above-discussed and other problems and addresses the above-discussed and other problems.

The present invention advantageously provides a novel image processing apparatus and image forming apparatus, such as a copying machine, a facsimile and a printer; image processing methods suitably applied to these apparatuses;

and computer readable recording medium in which a program for the method to be executed by a computer is recorded. The apparatuses, the methods, and the medium can be widely used supporting various kinds of systems by changing a value to be compared when a volume of a buffer memory is changed.

The present invention also advantageously provides the apparatuses, the methods, and the medium of a high productivity capable of a high speed access even with a relatively smaller buffer memory volume by: (i) reducing a volume of data exchanged with a secondary memory device, (ii) decreasing a memory processing time with the secondary memory device, and (iii) increasing the number of an original documents to be memorized.

According to the embodiment of the present invention, there is provided an image processing apparatus, method and computer readable recording medium provided with a primary memory device and a secondary memory device both having image data memorized therein, in which said image data are input to said primary memory device, and including an external input data amount acquisition device acquiring the amount of said image data input to said primary memory device; an internal output data amount acquisition device acquiring the amount of said image data output from said primary memory device and input to said secondary memory device; a first difference data amount calculation device subtracting the amount of the data acquired by said internal output data amount acquisition device from the amount of the data acquired by said external input data amount acquisition device, and calculating first difference data amount by the subtraction; a memory access control device practicing the inputting and outputting of said image data with time sharing in said primary memory device, comparing said first difference data amount with a first value and a second value larger than said first value, stopping the processing of outputting said image data from said primary memory device to said secondary memory device when said first difference data amount reaches the value equal to or smaller than said first value, and starting again the processing of outputting said image data from said primary memory device to said secondary memory device when said first difference data amount reaches the value equal to or larger than said second value; and an error signal outputting device comparing said first difference data amount with a third value larger than said second value and a fourth value smaller than said first value, and outputting an error signal when said first difference data amount reaches the value equal to or larger than said third value or when said first difference data amount reaches the value equal to or smaller than said fourth value.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 8A and 8B explain a state of writing and reading out of data in an image memory when inputting an image data to a image memory;

FIGS. 9A and 9B explain a state of writing and reading out of data in an image memory when inputting an image data into image memory.

FIGS. 13A, 13B, and 13C explain a processing of renewing a set value according to the second embodiment of the present invention;

DETAILED DESCRIPTION OF THE PREFERRED EMBODIMENTS

Figure 1:
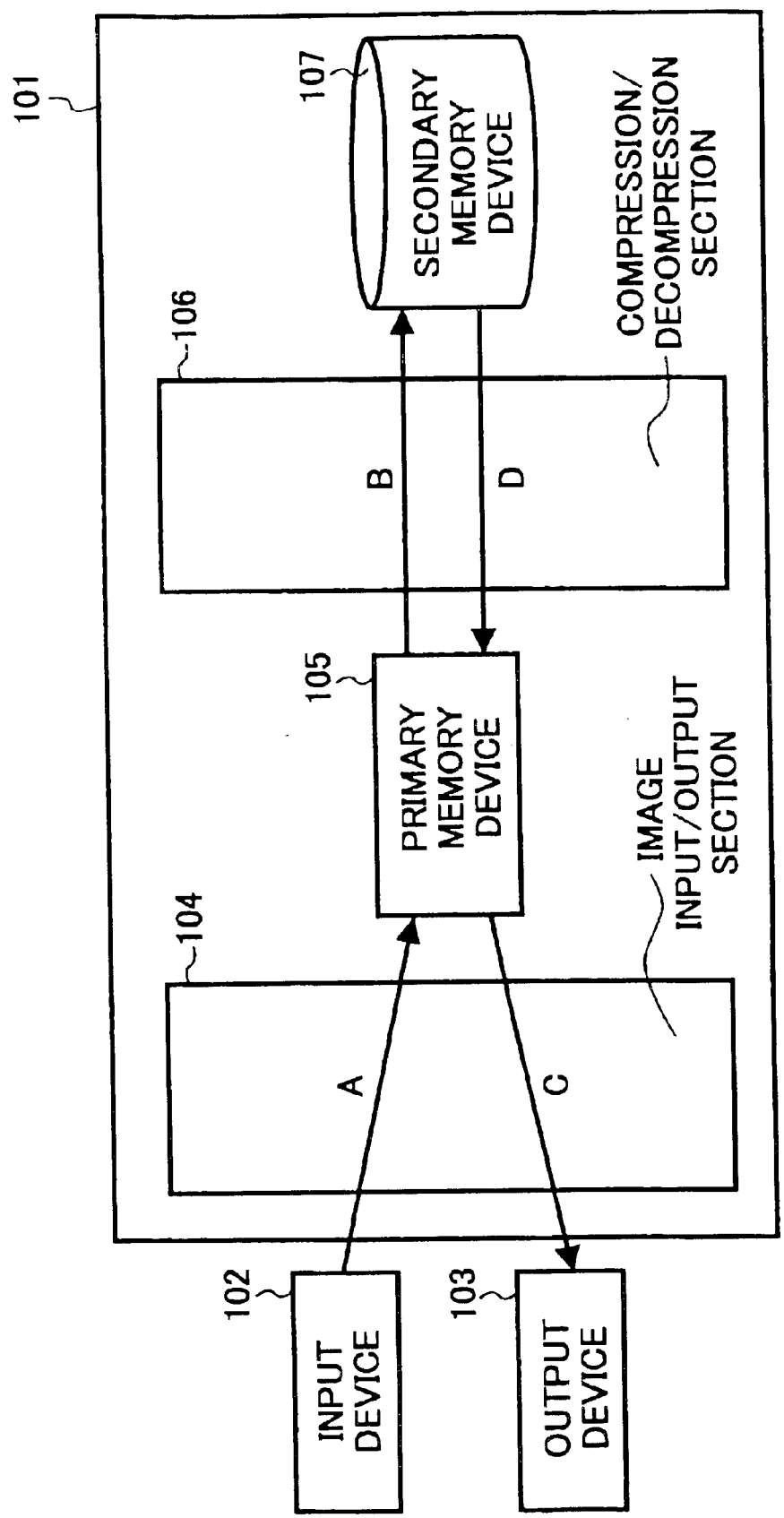
FIG. 1 is a block diagram illustrating a basic construction and operation of an image processing apparatus according to an embodiment of the present invention.

Referring now to the drawings, wherein like reference numerals designate identical or corresponding parts throughout the several views, and more particularly to FIG. 1 thereof there is illustrated an image processing apparatus 101 according to the present invention. The image processing apparatus 101 constitutes a copying apparatus in combination with an input device 102, such as a scanner, a printing section to perform a printing, and an output device 103, such as a plotter.

The image processing apparatus 101 includes an image input/output section 104, a primary memory device 105, a compression/decompression section 106, and a secondary memory device 107. The primary memory device 105 stores image data A input from the input device 102 through the image input/output section 104. The stored image data is output to the secondary memory device 107 (image data B). The image data is compressed by the compression/decompression section 106 and is stored in the secondary memory device 107.

The image data stored in the secondary memory device 107 is read out when necessary (image data D). The image data read out is decompressed by the compression/decompression section 106 and is input to the primary memory device 105. The image data is processed and edited by the primary memory device 105, and is output to the output device 103 (image data C) through the image input/output section 104. The primary memory device 105 illustrated in FIG. 1 includes a semiconductor memory. The secondary memory device includes a hard disk drive, which can store larger amount of data than a semiconductor memory.

Figure 2A:
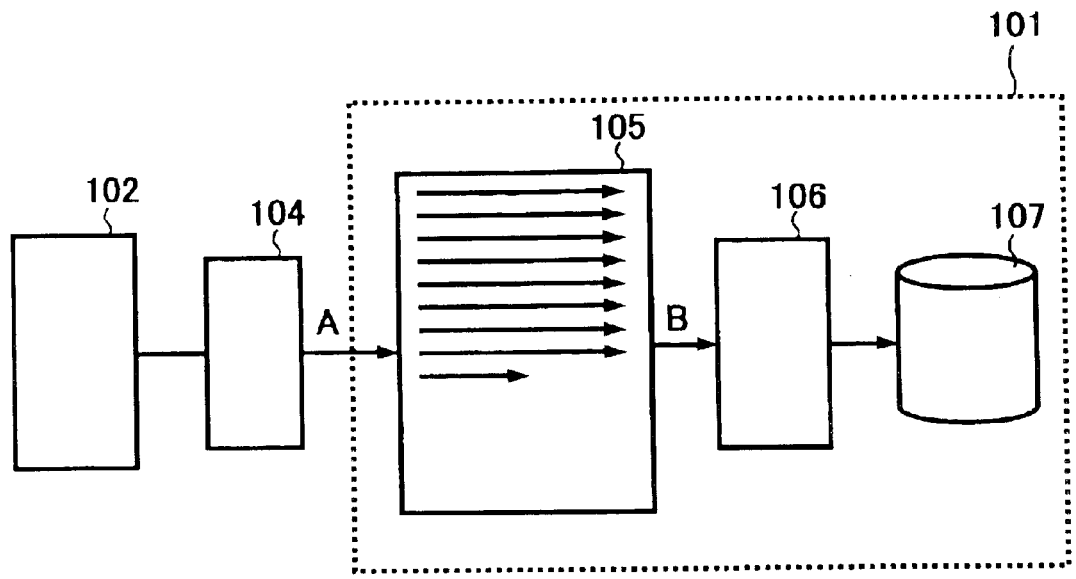
FIG. 2A explains a flow of image data from a primary memory device to a secondary memory device.

When image data is input to the secondary memory device 107 from the primary memory device 105, the image data A, input by the input device 102, is input to the primary memory device 105 through the image input/output section 104, as illustrated in FIG. 2A, and is then bit-mapped. That is, the image data A is stored in the primary memory device 105 in a condition that a line formed by arranging image data of each pixel in a main scanning direction in image reading (hereinafter referred to as a line) is arranged parallel to a sub-scanning direction.

The image data A stored in the primary memory device 105 is read out from the primary memory device 105 as the image data B. The image data B is compressed by the compression/decompression section 106 and is then stored in the secondary memory device 107. The above-described image data input operation is performed, for example, when the primary memory device 105 is used as a buffer to absorb a difference of transfer speed of image data between the input device 102 and the secondary memory device 107.

In operations shown in FIG. 1, the image data A is input to the primary memory device 105 and is stored. In parallel with the storage, the image data B is output from the primary memory device 105. During the operation, it may happen that an amount of the image data A becomes larger than that of the image data B in the primary memory device 105 due to a difference between a transfer speed of the image data A to the primary memory device 105 and a transfer speed of the image data B to the compression/decompression section 106. When the amount of the image data A becomes larger than that of the image data B, it may happen that image data, in the primary memory device 105 which has not been output, may be lost by being overwritten by the newly input image data A. According to a first embodiment of the present invention, when image data is input, an error signal is generated to avoid part of image data being lost, when the amount of the image data A becomes larger than that of the image data B by a predetermined amount of data or more.

When image data is input to the primary memory device 105 from the secondary memory device 107, the image data D read out from the secondary memory device 107 is stored in the primary memory device 105 after it has been decompressed by the compression/decompression section 106. The image data D is read out from the primary memory device 105 and is output to the output device 103 through the image input/output section 104 as the image data C. The above-described image data output operation is performed, for example, when printing image data stored in the secondary memory device 107 by storing a each part of the image data in the primary memory device 105.

Figure 2B:
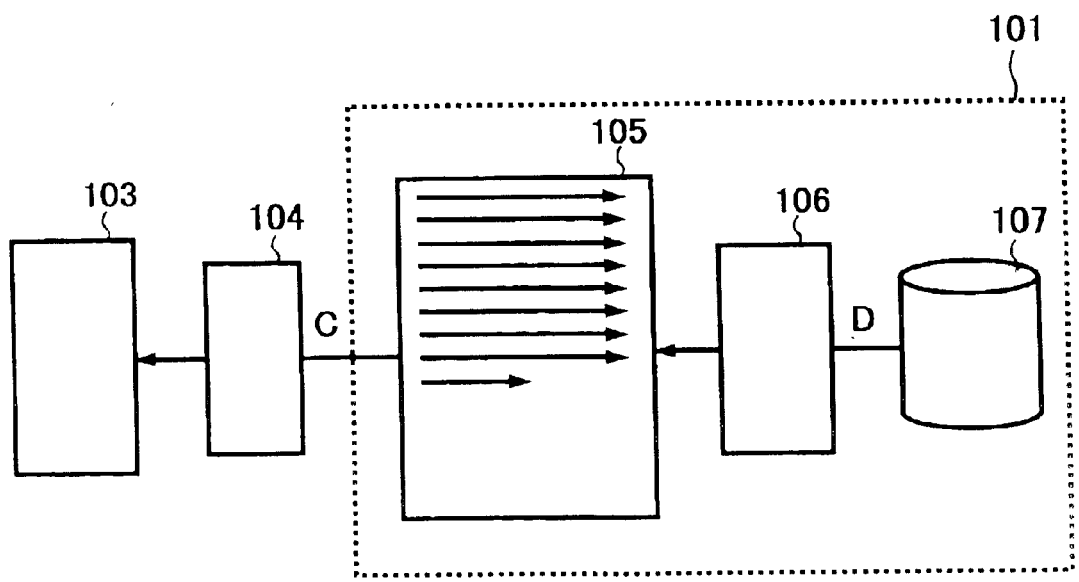
FIG. 2B explains a flow of image data from a secondary memory device to a primary memory device.
Figure 3:
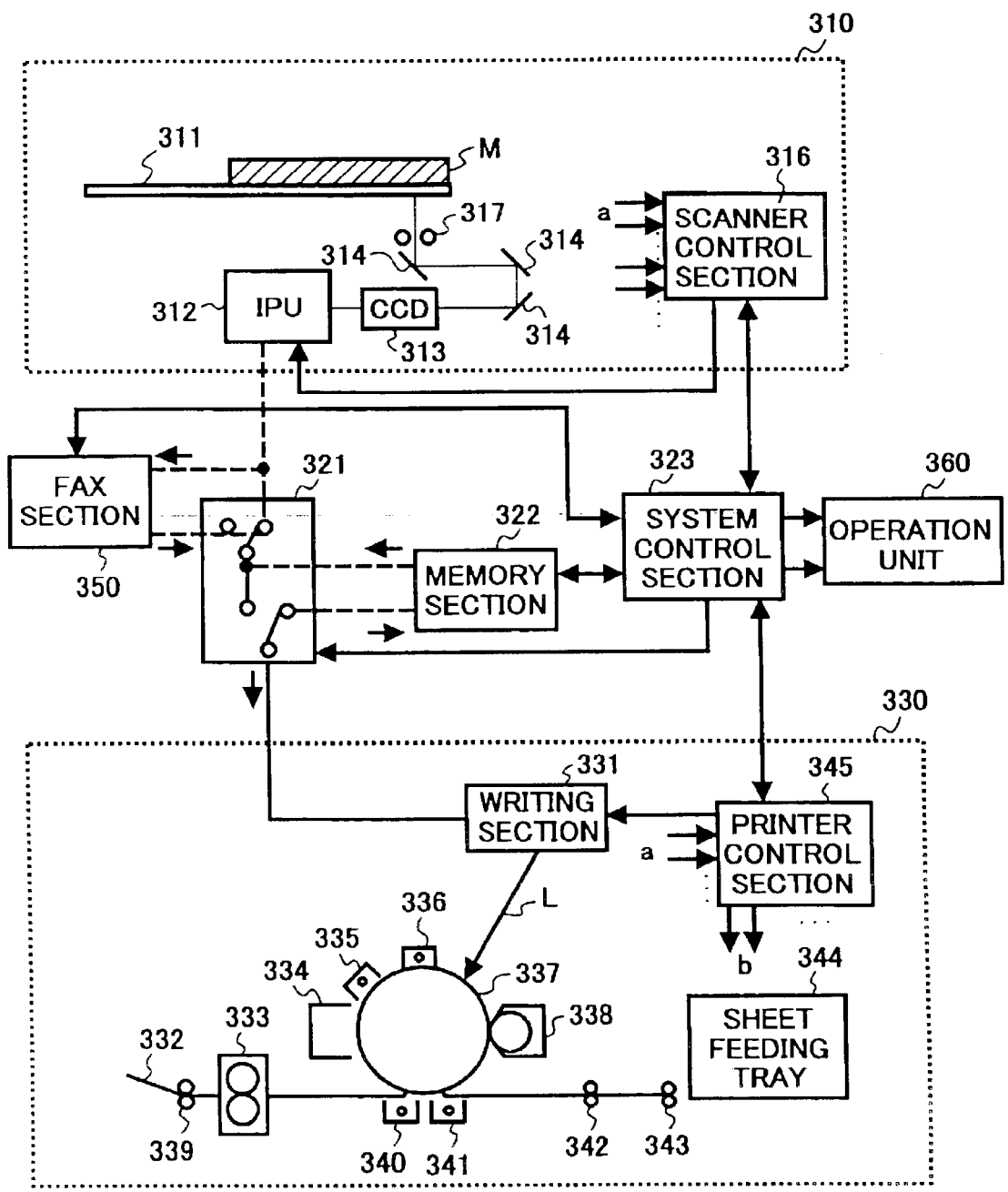
FIG. 3 illustrates an image processing apparatus common to first, second, and third embodiments of the present invention.

In operations shown in FIG. 2B, it may happen that an amount of the image data D becomes larger than that of the image data C in the primary memory device 105 due to a difference between a transfer speed of the image data D to the primary memory device 105 and a transfer speed of the image data C to the image input/output section 104. When the amount of the image data D becomes larger than that of the image data C, it may happen that image data, in the primary memory device 105 which has not been output, may be lost by being overwritten by the newly input image data D. According to a first embodiment of the present invention, when image data is output, an error signal is generated to avoid part of image data being lost, when the amount of the image data D becomes larger than that of the image data C by a predetermined amount of data or more.

According to a second embodiment of the present invention which will be described below, a setting of the predetermined amount of data described in the first embodiment of the present invention can be renewed according to a input/output state of image data in the primary memory device 105. Timing used to generate the error signal can be adjusted according to a state of image processing so that the primary memory device 107 can be efficiently used.

Further, according to a third embodiment of the present invention which will be described below, in an image data output operation, the image data D is made to be part of data for image data of one original document. With this arrangement, the primary memory device can be downsized or it can be possible that part of a memory capacity of the primary memory device 105 is used for storing image data and remaining part of the memory capacity of the primary memory device 105 is used for processing and editing image data.

First Embodiment

An exemplary embodiment of an image processing apparatus according to a first embodiment of the present invention is a digital multi-functional image forming apparatus (hereinafter referred to as an image forming apparatus), which includes an image reading section 310 to read an original document, an image forming section 330 to form an image on a transfer sheet and discharge it, and a FAX section. In the image reading section 310, an image of the original document M disposed on a platen 311 is read. The platen 311 has a size of, for example, 12-inches in length and 17-inches in width. The original document M is disposed on the platen 311 by adjusting a standard part S thereof to the most upper end and right end of the platen 311. The platen 311 includes a sensor (not shown) to detect a position of the original document M.

An exposing lamp 317 scans and exposes the original document M by moving under the platen 311. Reflected light from the original document M is led to a CCD (Charged-Coupled Device) sensor 313 by a reflected light mirror 314. The light is then converted to an analog electric signal by the CCD sensor 313 according to an intensity of the light and is input to an IPU (Image Processing Unit). The IPU 312 generate an image data by transforming the analog electric signal to a digital signal of 8 bits. The IPU 312 performs processing including a shading compensation, a magnification/reduction processing and a dither processing. The IPU 312 transmits each line of the processed image data to a memory section 322 or to a writing section 331 of the image forming section 330 through a selection section 321 together with a synchronizing signal.

A scanner control section 316 inputs detecting signal "a" from various sensors (not shown) in order to perform the above-described process of the image reading section 310. The scanner control section 316 controls a driving motor (not shown) to drive the CCD sensor 313 according to the detecting signal "a", and also sets various parameters for the IPU 312.

In the image forming section 330, a surface of a photoconductive element 337, which rotates in a clockwise direction at a fixed speed, is uniformly charged by a charging device 336. In the writing section 331, a latent image is formed on the surface of the photoconductive element 337 by laser beam light modulated according to image data. The latent image is developed into a toner image with toner in a developing device 338. The toner image is transferred onto a transfer sheet by a transfer charger 341.

Residual toner remaining on the surface of the photoconductive element 337 is removed by a cleaning device 334, and a residual charge thereof is removed by a discharging device 335. The writing section 331 includes a known laser writing system including a laser diode, a polygon mirror, a polygon motor, an fθ lens, and a synchronization detecting element (not shown).

A transfer sheet (not shown) set in a sheet feeding tray 344 is conveyed by a sheet feeding roller 343, and is then conveyed by a registration roller 342 so as to be in register with a toner image on a surface of the photoconductive element 337. The transfer sheet is separated from the photoconductive element 337 by a separation charger 340 after the transfer charger 341 has transferred the toner image onto it. The toner image is fixed by a fixing device 333, and is discharged to an exit tray 332 by a sheet discharging roller 339.

A printer control section 345 inputs detecting signal "a" from various sensors (not shown) in order to perform the above-described process of the image forming section 330. The printer control section 345 controls a driving motor (not shown) to drive the writing section 331 according to the detecting signal "a".

The image forming apparatus illustrated in FIG. 1 includes a system control section 323, an operation unit 360, the memory section 322, and the FAX section 350. An instruction to the system control section 323 is given through a key input to the operation unit 360. When a key input is done, the system control section 323 detects a content of instructions for copying. According to the content of the instructions, the system control section 323 sets various parameters for the memory section 322, the scanner control section 316 of the image reading section 310, and the printer control section 345 of the image forming section 330 or it provides these sections with instructions to execute respective process. The system control section 323 provides instructions to display a state of a whole system on a screen of a display provided in the operation unit 360.

The memory section 322 inputs image data of an original document from the IPU 312 through the selection section 321 and stores it. The stored image data is used for a copying application for editing and processing of an image, such as a repeat copy, an image rotation copy, an electronic sorting, an image division, and so forth. The memory section 322 is also used as a buffer memory to temporarily store binary image data, which the FAX section 350 received. A data storing operation in the memory section 322 is controlled by the system control section 323.

The selection section 321 selects a source of image data, to be used for an image forming in the image forming section 330, either from the image reading section 310 or the memory section 322. The selection section 321 also selects a source of image data to be stored in the memory section 322 either from the image reading section 310 or the FAX section 350.

Figure 5:
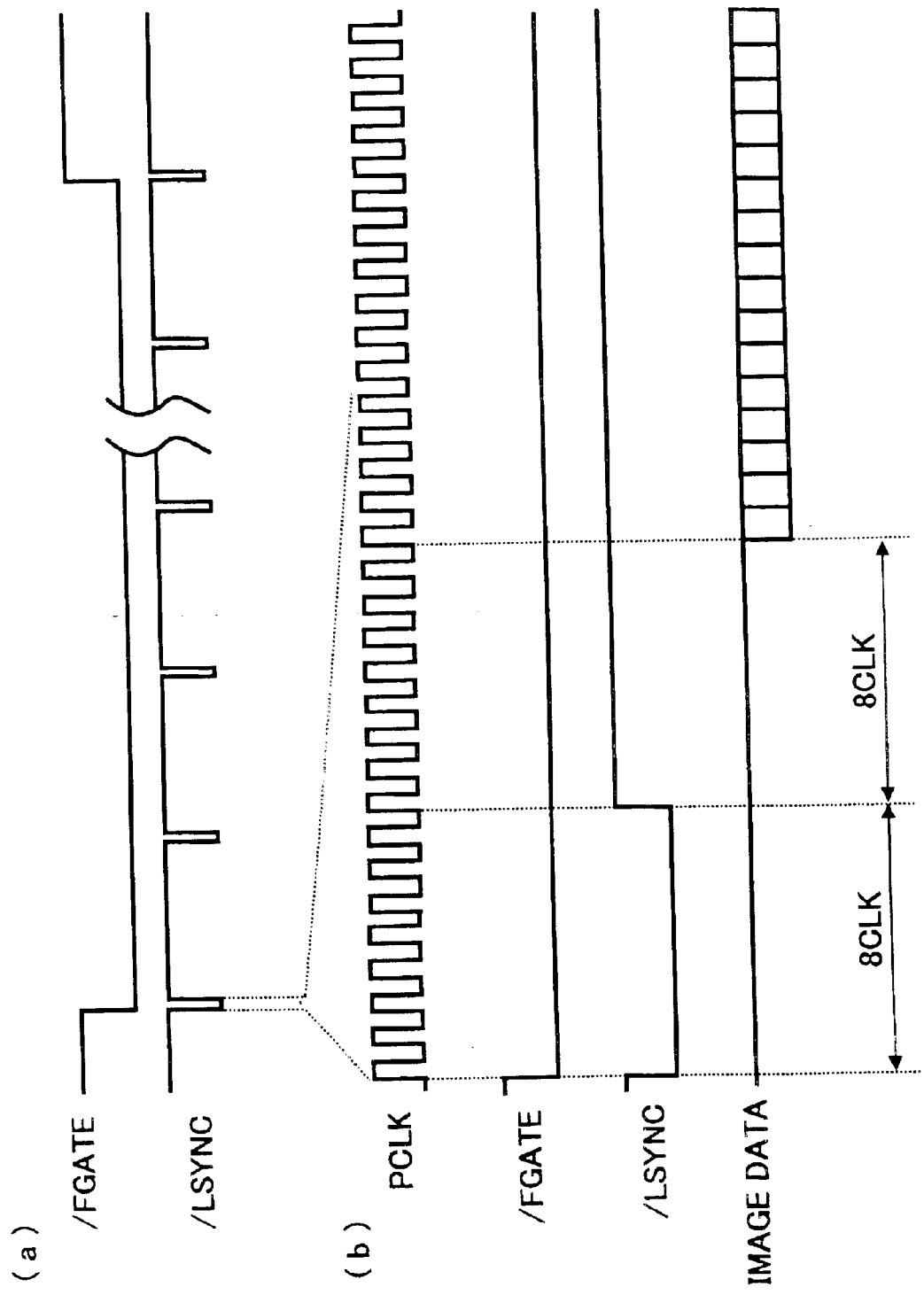
FIG. 5 is a timing chart showing synchronizing signals of image data output from an IPU (Image Processing Unit) in FIG. 3.

Image data output from the IPU 312 synchronizes with various synchronizing signals shown in FIG. 5. A frame gate signal (/FGATE) indicates an image effective range of an image area in a sub-scanning direction. Image data is effective during the frame gate signal (/FGATE) when at a low level (active-low). The frame gate signal (/FGATE) is asserted or negated with a trailing edge of a line synchronizing signal (/LSYNC). The line synchronizing signal (/LSYNC) remains asserted during a predetermined number of a pixel clock (PCLK) counting from a leading edge of the pixel clock (PCLK). After a rise of the line synchronizing signal (LSYNC), a predetermined number of clock signals are generated, and then an image data in a main scanning direction becomes effective.

Figure 4:
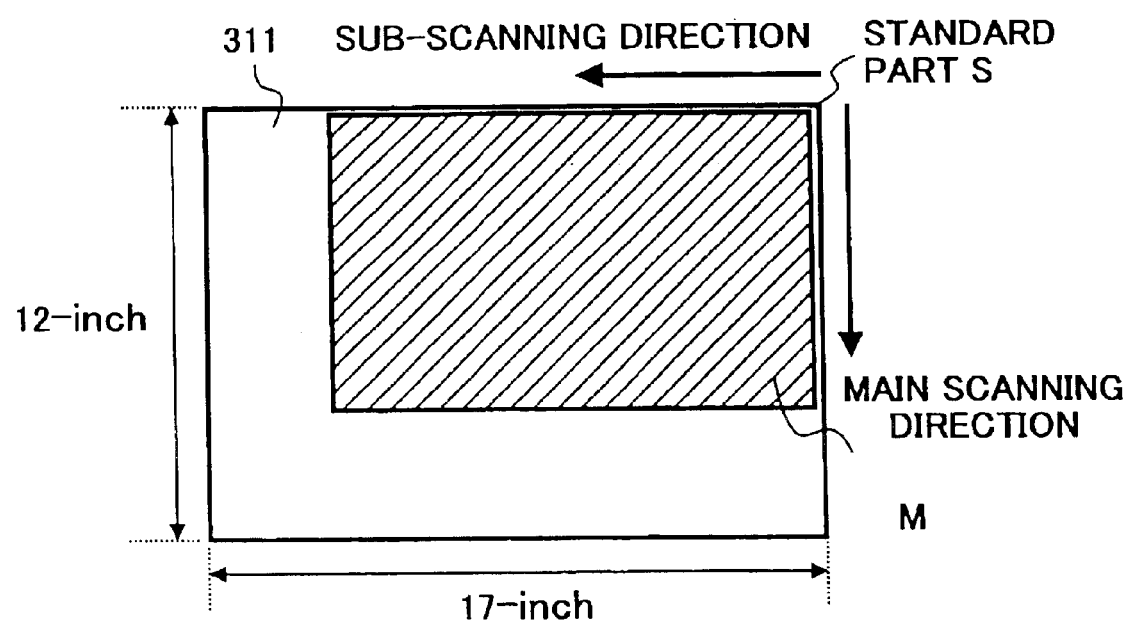
FIG. 4 illustrates an original document M shown in FIG. 3.

The IPU 312 outputs one image data for one cycle of the pixel clock (PCLK). The one image data is one of image data of an original document divided into a equivalent of 400 dpi in a main scanning direction and a sub-scanning direction from the standard part S in FIG. 4. The divided image data is sent out as a raster type data heading the image data positioned at the standard part S. An effective range of an image data in a sub-scanning direction is generally decided according to a size of a transfer sheet.

The FAX section 350 carries out a binary compression of an image data based on G3 and G4 FAX data transmission regulations according to an instruction from the system control section 323 and transfers the compressed image data to a telephone line. Data transferred to the FAX section 350 from a telephone line is decompressed to a binary image data, and is transferred to the writing section 331 of the image forming section 330 to form a visual image.

Figure 6:
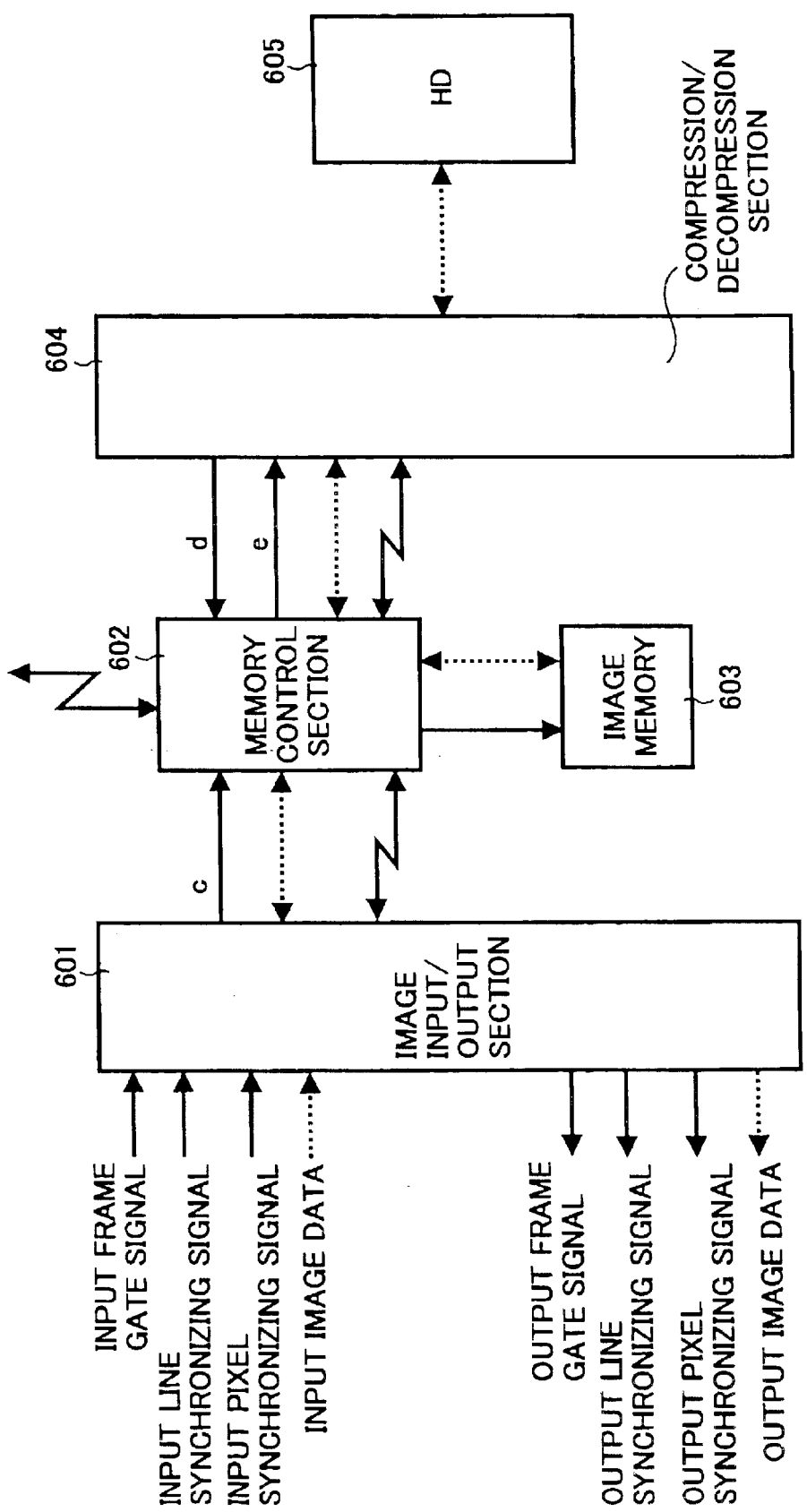
FIG. 6 is a block diagram illustrating details of a memory section in FIG. 3.

As illustrated in FIG. 6, the memory section 322 includes a memory control section 602, an image input/output section 601 controlled by the memory control section 602, a compression/decompression section 604, an image memory, which is a primary memory device and includes a semiconductor memory, and a hard disk drive (HD) 605 as a secondary memory device that exchanges data with the compression/decompression section 604. According to the embodiment of the present invention, the image input/output section 601, the compression/decompression section 604, and the memory control section 602 include a CPU and logic circuits.

According to the first embodiment of the present invention, the image memory 603 includes a semiconductor memory element, such as a DRAM (Dynamic Random Access Memory). A volume of the memory is set to be 2M byte. That is, the sum total of the memory volume is 400 DPI (Dot Per Inch), which is equivalent to a binary image data of A4 size paper. The hard disk drive 605 is a secondary memory device, which includes a magnetic recording medium and has a memory capacity larger than that of the image memory 603. An information recording device, such as a magneto-optical recording device can also be used as a secondary memory device if the device can store data in volume having a certain level of data access speed.

The image input/output section 601 receives a command from the memory control section 602 by communicating with it and makes operation settings according to the command. The image input/out section 601 transmits status information to the memory control section 602 to inform a state of input/output of an image. When the image input/output section 601 receives a command of an image input from the memory control section 602, the image input/output section 601 inputs image data transmitted from the IPU 312 (indicated by a dotted line in FIG. 6) line-by-line together with synchronizing signals (an input frame gate signal, an input line synchronizing signal, and an input pixel synchronizing signal), which are used to decide a time to input an image. According to the input pixel synchronizing signal, the image input/output section 601 outputs input image data line-by-line as memory data of 8-pixel unit together with an input/output memory access signal "c" to the memory control section 602 whenever necessary.

When an image data is input, the image input/output section 601 acquires a volume of input data and outputs the acquired data volume to the memory control section 602.

According to the embodiment of the present invention, a volume of image data is acquired by counting the number of lines of input/output image data. The number of lines counted is output to the memory control section 602.

In an image processing apparatus, which outputs and inputs line-by-line image data, a volume of an image data can be acquired, for example, by counting an input line synchronizing signal. Therefore, the apparatus does not need to have an exclusive device separately to acquire a volume of image data, which is advantageous for avoiding an increase in the number of parts used.

When the image input/output section 601 receives a command for an image output, it outputs image data, input through the memory control section 602, to the writing section 331 in synchronization with synchronizing signals (an output frame gate signal, an output line synchronizing signal and an output pixel synchronizing signal), which are used to decide a time to output an image.

The compression/decompression section 604 receives a command from the memory control section 602 by communicating with it and makes operation settings according to the command. Further, the compression/decompression section 604 transmits status information to the memory control section 602 to inform a state of compression and decompression processing. When the compression/decompression section 604 receives a command of compression from the memory control section 602, the compression/decompression section 604 outputs a transfer memory access signal "d" to the memory control section 602, and receives a transfer memory access permission signal "e" from the memory control section 602.

When the transfer memory access permission signal "e" is active, the compression/decompression section 604 receives image data and compresses it, which is stored in the hard disk drive 605 as a compressed data. During the operation, the compression/decompression section 604 acquires a volume of data of an image to be compressed and outputs the acquired data to the memory control section 602. A volume of data is acquired by counting the number of lines of image data (the number of lines of image data output from the image memory 603).

When the compression/decompression section 604 received a command of decompression, it reads out compressed data stored in the hard disk drive 605, and decompresses the data. The decompressed date is output to the memory control section 602. The compression/decompression section 604 exchanges a transfer memory access signal "d" and a transfer memory access permission signal "e" with the memory control section 602.

As described above, data volume is reduced by arranging the compression/decompression section 604 between the hard disk drive 605 and the image memory 603, which reduces a data volume to be stored in the hard disk drive 605 enabling the hard disk drive 605 to store a larger volume of data.

The memory control section 602 receives a command from the system control section 323 by communicating with it and makes operation settings according to the command. The memory control section 602 transmits status information to the system control section 323 to inform a state of the memory section 322.

The system control section 323 outputs operation commands including an image input, an image output, a compression and a decompression. The commands of the image input and output are transmitted to the image input/output section 601, while the compression and decompression commands are transmitted to the compression/decompression section 604.

Figure 7:
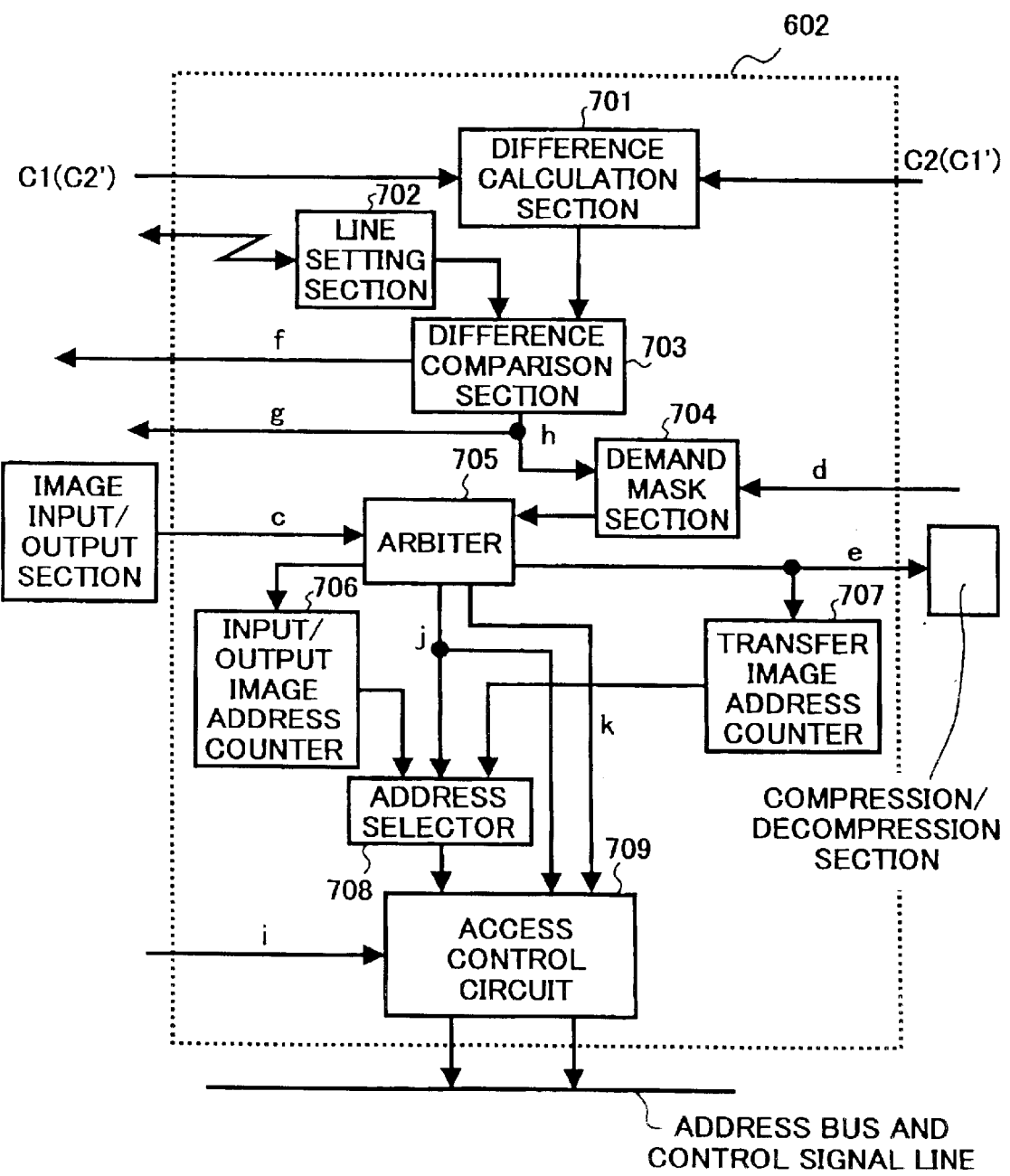
FIG. 7 is a block diagram explaining a transfer of image data to a secondary memory device in a memory control section in FIG. 6.

As shown in FIG. 7, the memory control section 602 includes a difference calculation section 701, a line setting section 702, a difference comparison section 703, a demand mask section 704, an arbiter 705, an input/output image address counter 706, transfer image address counter 707, an address selector 708, and an access control circuit 709.

When the image memory 603 is used as a buffer memory for inputting image data, the difference calculation section 701 calculates a difference in the number of lines by subtracting the number of lines of image data C2 output from the image memory 603 (output line number) from the number of lines of image data C1 input to the image memory 603 (input line number).

The line setting section 702 receives the number of lines, which is compared with a difference in the number of lines in the difference comparison section 703, from the system control section 323 and sets the number of lines in the memory control section 602. The number of lines (set line number) can be freely set.

By having the line setting section 702, the number of lines compared with a difference in the number of lines can be changed according to system requirements, such as a line period of input image data, a transfer speed with the hard disk drive 605 and so forth. Accordingly, the apparatus can be widely used supporting various kinds of systems.

The difference comparison section 703 compares the difference in the number of lines calculated by the difference calculation section 701 with the number of lines set by the line setting section 702. According to a comparison result obtained at the difference comparison section 703, the demand mask section 704 masks a transfer memory access signal "d" (makes the transfer memory access signal disabled). The arbiter 705 outputs a transfer memory access permission signal "e" so that the compression/decompression section 604 can access the image memory 603. The transfer memory access permission signal "e" is output under the condition that an address comparison signal is active and that an input/output memory access signal "c" is non-active.

The input/output image address counter 706 counts up an address according to an input/output memory access signal "c" and outputs a memory address of 22 bits to the address selector 708 showing an address when an image data is stored in the image memory 603. The memory address in the address selector 708 is once initialized when a memory access starts.

The transfer image address counter 707 counts up an address according to a transfer memory access permission signal "e" and outputs a memory address of 22 bits to the address selector 708 showing an address when an image data is stored in the image memory 603. The memory address in the address selector 708 is once initialized when a memory access starts.

An address of either an input image or a transfer image is selected by the arbiter 705 in the address selector 708. The access control circuit 709 divides an address of a DRAM included in the image memory 603 into row address and a column address corresponding to a physical address selected in the address selector 708, and outputs them to an address bus of 11 bits. The access control circuit 709 also outputs DRAM control signals (Row Address Stroke, Column Address Stroke, Write Enable) according to an access start signal from the arbiter 705.

A control of the image memory 603 by the memory control section 602 when an image data is input to or output from the image memory 603 will be described below.

1. Inputting Image Data

When inputting image data, for example, from a scanner of the image reading section 310, at the memory control section 602, the difference calculation section 701 subtracts the number of external output lines C2 from the number of internal input lines C1 input into the image memory 603 so as to obtain the number of difference. The difference calculation section 703 compares the number of difference with the predetermined first, second, third and fourth values.

The memory control section 602 controls the image input/output section 601 and the compression/decompression section 604, and stops the process of outputting image data from the image memory 603 when the number of difference reaches a value not greater than the first value. Further, the memory control section 602 resumes the process of outputting the image data from the image memory 603 when the number of difference reaches a value not smaller that the second value. Furthermore, the memory control section 602 outputs an error signal when the number of difference reaches a value not smaller than the third value or a value not greater than the fourth value.

The relationship of the first, second, third, and fourth values in size is expressed as follows;

third value>second value>first value>fourth value

The first to fourth values used in the comparison with the number of difference are set at the difference calculation section 703. These values are changeable as necessary.

Now, the process of outputting an error signal and the process of stopping and resuming image data transfer performed according to the first to fourth values are described.

(1) Process for Outputting an Error Signal

The demand mask section 704, the arbiter 705, the input/output address counter 706, the transfer image address counter 707, the address counter 708 and the access control section 709 are operated on a basis of the judgment of the difference comparison section 703. The access control circuit 709 generates a control signal by the operation based on the judgement of the difference comparison section 703. The control signal is output via an address bus and a control signal line, and controls the image input/output section 601 and the compression/ decompression section 604.

The difference comparison section 703 compares the number of difference with the third value, and outputs an error signal "f" when the number of difference reaches a value not smaller than the third value. The error signal "f" is used as a control signal of the image processing apparatus 101 and prevents the image data stored in the image memory 603 from being overwritten to be lost by the image data newly input.

The difference calculation section 703 compares the number of difference (C1−C2) and the number of set lines (first value V1, second value V2, third value V3, fourth value V4) output by the line setting section 702. When either of the following conditions is satisfied, the error signal "f" is output:

$C1-C2 \geq V3$ [1]

$C1-C2 \leq V4$ [2]

The operation of outputting the error signal "f" when the condition [1] is satisfied is made for preventing the image data stored in the image memory 603 from being lost. This operation can be realized, for example, by inputting the error signal "f" into the operation unit 360 so as to display a message indicating that the error has occurred in a display screen of the operation unit 360. According to this configuration, the operator can recognize, based upon the display in the display screen, that the image memory 603 can not store additional image data any more, and thereby can stop the whole system of the image processing apparatus 101, or the error signal "f" can be output to the controller of the whole system so as to cause the controller to temporarily stop the reading operation of the image reading section 310 to thereby prevent the image data from being lost as a result of being overwritten.

Alternatively, the error signal "f" can be input into the scanner control section 316 so as to stop the scanner of the image reading section 310 with the error signal "f", and thereby input of image data into the image memory 603 can be automatically stopped. Further alternatively, the scanner control section 316 may be controlled such that the reading speed of the scanner of the image reading section 310 is decreased.

The operation of outputting the error signal "f" when the condition [2] is met is for outputting information informing that no image data for transferring to the hard disk drive 605 exists in the image memory 603. Further, when the fourth value is set to zero, the controller controlling the whole part of the image processing apparatus 101 is informed of that a system error, in which the number of difference is calculated to be a negative number, has occurred.

(2) Process for Stopping and Resuming Image Data Transfer

The difference calculation section 703 compares the number of external input lines C1 and the number of internal output lines C2, and when the following condition is satisfied:

$C1-C2 \leq v1$ [3]

the transfer demand mask signal "h" to be output to the demand mask section 704 is made active. The demand mask signal "h" output by the difference comparison section 703 is input into the demand mask section 704.

At the same time, the compression/decompression section 604 inputs into the demand mask section 704 a transfer access demand signal "d". The demand mask section 704 determines if the transfer demand mask signal "h" is active. When the transfer demand mask signal "h" is active, the demand mask section 704 masks (disables) the transfer access demand signal "d". By this process, when the transfer access demand signal "d" is masked, the process of transferring image data from the image memory 603 to the hard disk drive 605 is stopped.

After the process of transferring image data from the image memory 603 to the hard disk drive 605 is stopped, the difference calculation section 703 compares the number of external input lines C1 and the number of internal output lines C2. When the following condition is satisfied:

$C1-C2 \geq V2$ [4], the masking of the transfer access demand signal "d" is released. The transfer access demand signal "d" is then input into the arbiter 705.

At this time, to the arbiter 705, the input/output memory access signal "c" output by the image input/output section 601 is input. The arbiter 705 outputs a transfer access approval signal "e" to the compression/decompression section 604 in response to the transfer access demand signal "d", when the input/output memory access signal "c" is not active and the transfer demand access signal "h" input via the demand mask section 704 is active. By the processes describe above, the process of transferring image date from the image memory 603 to the hard disk drive 605 is resumed.

Further, at this time, the arbiter 705 counts up the input/output image address counter 706 in accordance with the input/output memory access signal "c", and counts up the transfer image address counter 707 in accordance with the transfer access approval signal "e". Each of the counted numbers is input into the address selector 708, and the address counter 708 selects either of the addresses of the input image or the transfer image according to the input counted number and the signal "f" output by the arbiter 705. With this configuration, according to the preferred embodiment of the present invention, the processes of stopping and resuming the operation of the memory control section 602 can be performed in parallel by time-sharing.

When inputting image data into the image memory 603, immediately after starting inputting of image data, the volume of image data stored in the image memory 603 is zero. At this time, if the process of transferring image data from the image memory 603 to the hard disk drive 605 is started, the image data for transfer to the hard disk drive 605 does not exist in the image memory 603 such that the condition [2] is satisfied, and thereby the transfer of image data may be stopped.

Therefore, in the image processing apparatus 101 according to the preferred embodiment of the present invention, before the memory control section 602 outputs image data from the image memory 603 to the hard disk drive 605, the memory control section 602 inputs into the image memory 603 image data having the volume corresponding to the first value. Further, the memory control section 602 controls the difference calculation section 703 so as to output the error signal "f" only when the process of outputting image data from the image memory 603 to the hard disk drive 605 is being executed.

Now, referring to FIGS. 8(a) and 8(b), the operation of the image memory 603 when inputting image data, according to the preferred embodiment 1, is described. FIG. 8(a) illustrates the total volume of image data accessing the image memory 603 in the midst of the image inputting operation, and FIG. 8(b) illustrates a state of the address being accessed at the image memory 603. The flows of image data indicated by A and B in FIGS. 8(a) and 8(b) correspond to the image data flows indicated by A and B in FIG. 1.

The difference calculation section 701 calculates the number of difference between the number of external input lines C1 expressing the data volume of image data A in the number of lines and the number of output lines C2 expressing the data volume of image data B in the number of lines, and outputs the error signal "f" when the value of the number of difference exceeds V3. By this operation, an over-running of the address, if occurring in the second round of image data inputting into the image memory 603 for either of the following reasons, can be recognized in an early stage so as to be stopped when:

1) The transfer to the secondary memory device 107 is extremely slow when compared with the inputting speed of image data.

2) The buffer memory size is not appropriate.

3) The process of transfer is abnormal.

The above can be realized in a relatively simple configuration because data volume of image data is managed based upon the difference between the number of input and output lines.

In the preferred embodiment 1, despite only a 2M bytes semiconductor memory being used in the image memory 603, 4M bytes image data is input into the memory section 322. Further, because the address counters 706 and 707 are configured so as to return to zero when the address of the highest order is accessed, if the volume of accessing data exceeds 2M bytes, the same address is accessed two times.

Further, when the value of the number of difference calculated by the difference calculation section 701 is not greater than V1, the process of transferring image data from the image memory 603 to the hard disk drive 605 is stopped. When the value of the number of difference is not smaller than V2, the transfer process is resumed. When the value of the number of difference is not greater than V4, the error signal "f" is output.

As described above, according to the preferred embodiment 1, the error signal "f" is sent to the system control section 323 when the condition [1] or [2] is satisfied when inputting an image. By this operation, such trouble as erroneously setting the predetermined values used for comparison or overrunning of a transfer process by an input process due to a system error can be found in an early stage so as to be stopped.

Next, the operation of the whole part of the memory section 322 according to the preferred embodiment 1 is described.

According to an image inputting instruction by the system control section 323, the memory control section 602 is initialized so as to be in an image data waiting state. Further, by the operation of the scanner of the image reading section 310, image data is input into the memory section 322. The input image data is input into the image memory 603 and is once written into the image memory 603. The number of the input lines C1 of the written image data is counted by the image input/output section 601 and is input into the memory control section 602.

The compression/decompression section 604 receives the image transfer command output by the memory control section 602 and outputs the transfer access demand signal "d". At this time, the transfer access demand signal "d" is masked by the demand mask section 704 at the memory control section 602, and memory access to the image memory 603 is not performed. Upon completion of the process of bit-mapping the image data into the image memory 603 for one line of the image data input from the image input/output section 601, masking of the transfer access demand signal "d" is released. Then, the operation of reading the image data stored in the image memory 603 and transferring the image data to the compression/decompression section 604 is started. Further, during the operation of inputting/outputting image data into/from the image memory 603, the difference calculation section 701 calculates the difference between the number of external input lines C1 and the number of internal output lines C2, and compares the difference with each of the first to fourth values. Then, as described above, according to the result of the comparison, an error signal is output, the transfer access demand mask signal "d" is masked, or masking of the transfer access demand signal "d" is released.

2. Outputting Image Data

Now, the operation of the image processing apparatus 101 when outputting image data is described. Description for common parts of the operation with the image inputting operation described above is partly omitted. When outputting image data to the image forming section 330, at the memory control section 602, the difference calculation section 701 subtracts the number of external output lines C2', output from the image memory 603 to the image forming section 330, from the number of internal input lines C1', input into the image memory section 603 from the hard disk drive 605, to obtain the number of difference. The difference calculation section 703 compares the number of difference with predetermined fifth, sixth, seventh, and eighth values.

The memory control section 602 controls the image input/output section 601 and the compression/decompression section 604, and when the number of difference reaches a value not greater than the fifth value, the operation of outputting image data from the image memory 603 is stopped. Further, the memory control section 602 resumes the operation of outputting image data from the image memory 603 when the number of difference reaches a value not smaller than the sixth value. Furthermore, when the number of difference reaches a value not smaller than the seventh value or a value not greater than the eighth value, the memory control section 602 outputs an error signal.

The relationship of the fifth, sixth, seventh, and eighth values in size is expressed as follows:

seventh value>sixth value>fifth value>eighth value

The fifth to eighth values used in comparison with the number of difference are set at the difference calculation section 703 by the line setting section 318. These predetermined values are changeable as necessary.

Now, the processes of outputting an error signal and stopping and resuming image data transfer, performed according to the fifth to eighth values, are described.

(1) Process of Outputting an Error Signal

The demand mask section 704, the arbiter 705, the input/output address counter 706, the transfer image address counter 707, the address counter 708 and the access control section 709 are operated on a basis of the judgment of the difference comparison section 703. The access control circuit 709 generates a control signal by the operation based on the judgement of the difference comparison section 703. The control signal is output via an address bus and a control signal line, and controls the image input/output section 601 and the compression/decompression section 604.

The difference comparison section 703 compares the number of difference with the seventh value, and outputs the error signal "f" when the number, of difference reaches a value not smaller than the seventh value. The error signal "f" is used as a control signal of the image processing apparatus 101 and prevents the image data stored in the image memory 603 from being overwritten to be lost by the image data newly input.

The difference calculation section 703 compares the number of difference (C1'-C2') output by the difference calculation section 701 and the number of set lines (fifth value V5, sixth value V6, seventh value V7, eighth value V8) output by the line setting section 702. When either of the following conditions is met, the error signal "f" is output:

$$C1'-C2' \geq V7 \quad [5]$$

$$C1'-C2' \leq V8 \quad [6]$$

The operation of outputting the error signal "f" when the condition [5] is met is made for preventing the image data stored in the image memory 603 from being lost. The operation of outputting the error signal "f" when the condition [6] is met is made for outputting information informing that sufficient image data for transferring to the image forming section 330 does not exist in the image memory 603.

(2) Process of Stopping and Resuming Image Data Transfer

The difference calculation section 703 compares the number of internal input lines C1' and the number of external output lines C2', and when the following condition is satisfied:

$$C1'-C2' \leq V5 \quad [7]$$

the transfer demand mask signal "h" to be output to the demand mask section 704 is made active. The transfer demand mask signal "h" output by the difference comparison section 703 is input into the demand mask section 704.

At the same time, the compression/decompression section 604 inputs into the demand mask section 704 a transfer access demand signal "d". The demand mask section 704 determines if the transfer demand mask signal "h" is active. When the transfer demand mask signal "h" is active, the demand mask section 704 masks (disables) the transfer access demand signal d. By this process, when the transfer access demand signal "d" is masked, the process of transferring image data from the image memory 603 to the hard disk drive 605 is stopped.

After the process in which image data are transferred from the image memory 603 to the hard disk drive 605 is finished, the difference comparison section 703 compares the input line number C1' with the output line number C2'. When the following condition:

$$C1'-C2' \geq V6 \quad [8]$$

is satisfied, the mask of the transfer access demand signal "d" is canceled. The transfer access demand signal "d" in which the mask has been canceled is input to the arbiter 705.

In this case, the input/output memory access signal "c" input from the image input/output section 601 has been input to the arbiter 705. When the input/output memory access signal "c" is inactive and the transfer demand mask signal "h" input via the demand mask section 704 is active, the transfer access permission signal "e" is output to the compression/decompression section 604 according to the transfer access demand signal "d". By performing the above-identified process, the process in which image data is transferred from the image memory 603 to the hard disk drive 605 is started again.

When image data are output from the image memory 603, the quantity of image data, which have been stored in the image memory 603, are zero soon after the image data start to be input from the hard disk drive 605 to the image memory 603. At this point, when the process in which image data are transferred from the image memory 603 to the image forming section 330 is started, it may occur a shortage of the image data, which are to be transferred to the image forming section 330, in the image memory 603. Therefore, there is a possibility that the condition 7 is satisfied and the image data transfer is stopped.

In order to avoid such a problem, in the image forming apparatus of the present embodiment image data whose quantity is equal to the fifth value are preliminarily input from the hard disk drive 305 to the image memory 603 before image data are output from the image memory 603 to the image forming section 330. In addition, the difference comparison section 703 is controlled so that an error signal is output only when the process in which image data are output from the image memory 603 to the image forming section 330 is performed.

Then image data inputting operations in the first embodiment will be explained referring to FIGS. 9A and 9B. FIG. 9A illustrates the total amount of image data being accessed to the image memory 603 during the image input operations. FIG. 9B illustrates a state of the accessed address in the image memory 603. The flows of image data indicated by C and D in FIGS. 9A and 9B correspond to the flows of image data indicated by D and C in FIG. 1, respectively.

The difference calculation section 701 calculates the line number difference between the input line number C1' and the output line number C2'. When the line number difference is greater than V7, an error signal "f" is output. By performing this operation, an address overtaking problem can be rapidly found when the address overtaking problem occurs during the second cycle, for example, for the following reasons that:

(1) the speed of image data transfer to the image forming section is extremely slow compared to the input speed of image data input from the secondary memory device;

(2) the buffer memory quantity is not adequate; and (3) the image data transfer process is in an abnormal state.

In addition, since the quantity of image data is controlled using the line number difference, the configuration of the section can be simplified.

Figure 10A:
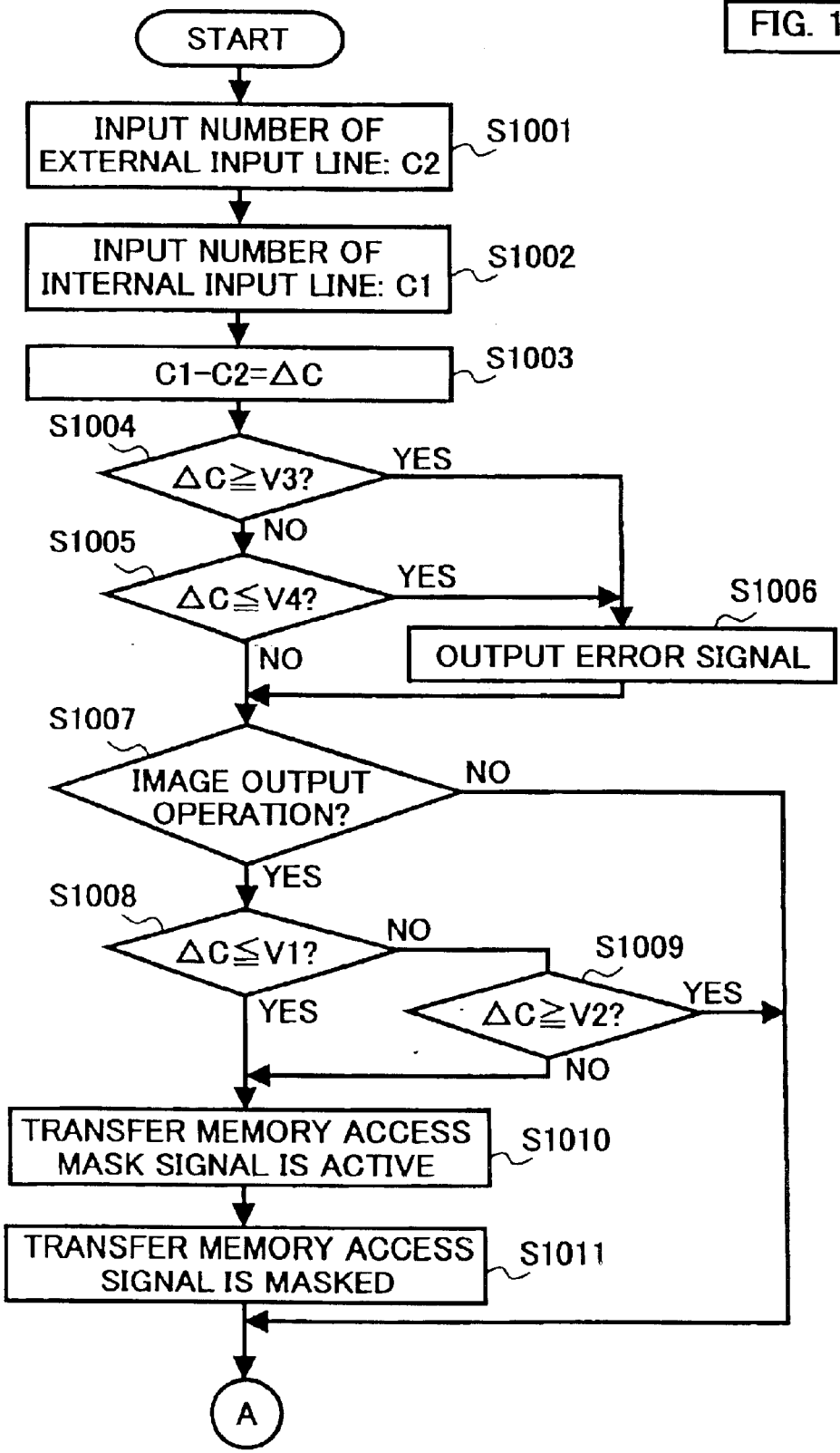
FIG. 10 is a flow chart explaining an image data input/output operation.
Figure 10B:
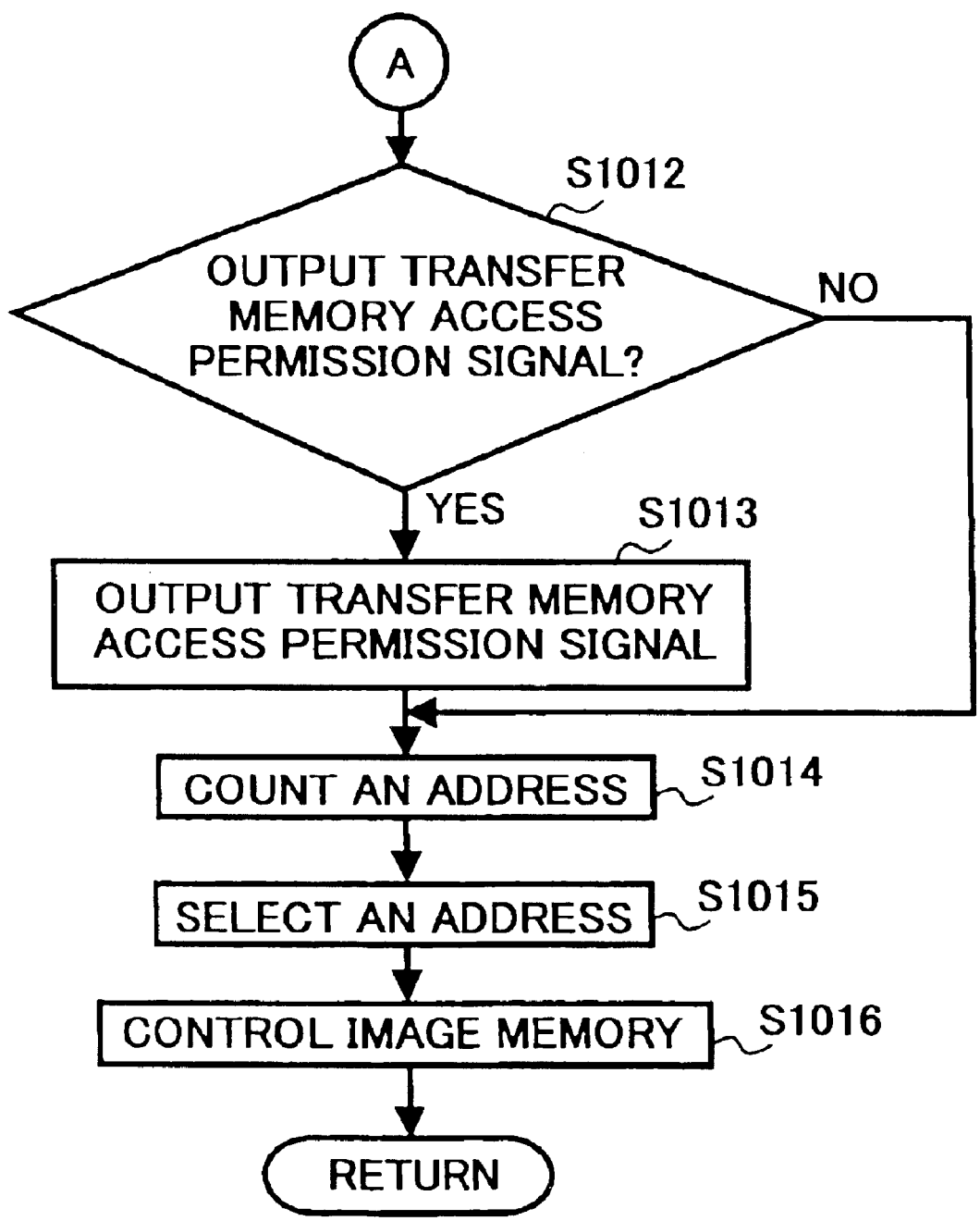
Figure 11A:
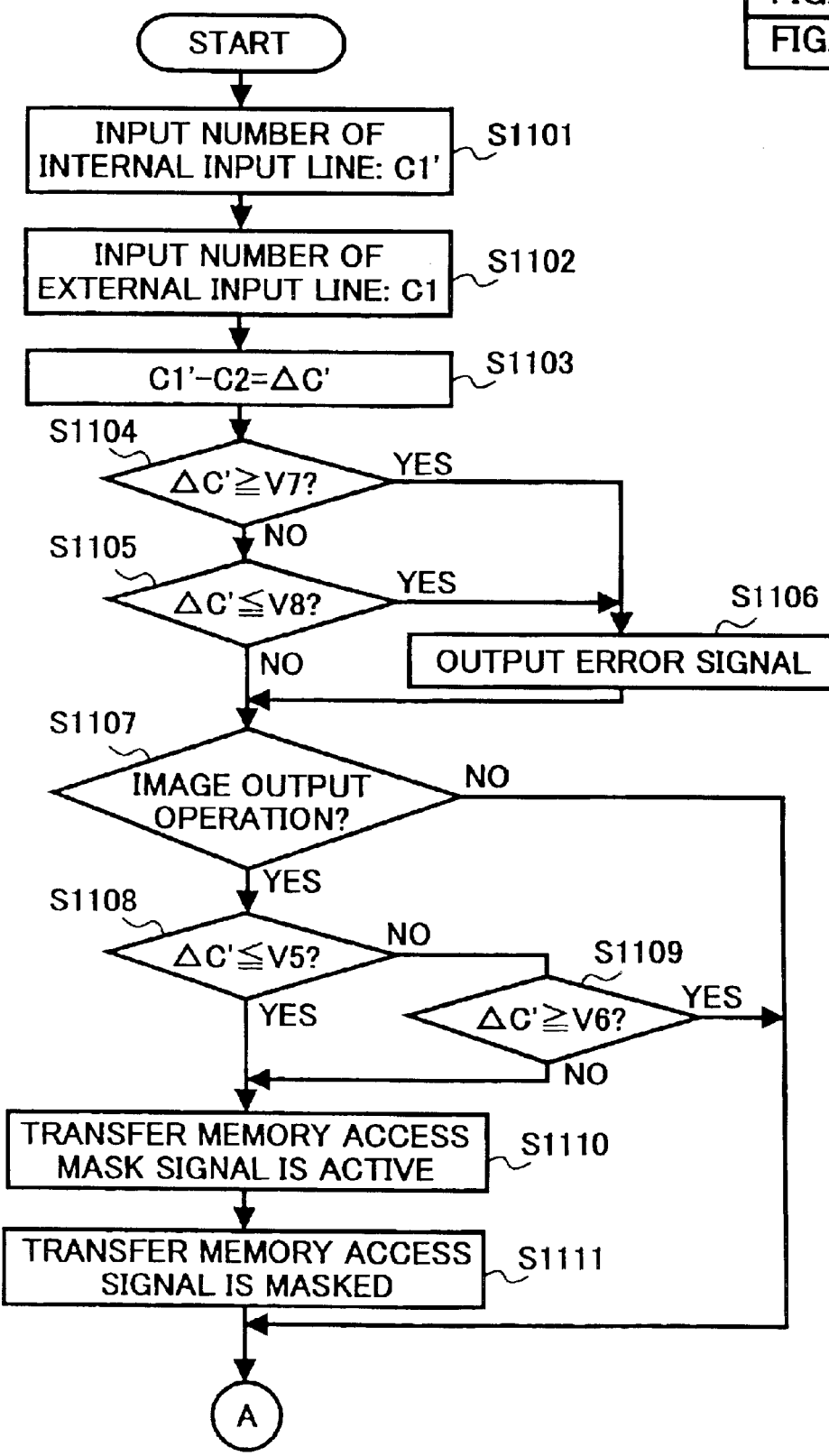
FIG. 11 explains a processing of outputting image data according to a first embodiment of the present invention.

Next, the above-mentioned processes in the first embodiment will be explained referring to the flowcharts as shown in FIGS. 10 and 11. FIG. 10 is a flowchart for explaining the process in which image data are input in the image processing apparatus. FIG. 11 is a flowchart for explaining the process in which image data are output in the image processing apparatus.

As illustrated in FIG. 10, when image data are input, the memory control section 602 at first inputs an external input line number C1 (Step S1001), and then inputs an internal output line number C2 (Step S1002). Then a value ΔC is determined by subtracting the internal output line number C2 from the external input line number C1 (Step S1003).

Then, the difference comparison section 703 judges whether ΔC is not less than V3 (Step S1004). When ΔC is not less than V3 (i.e., "Yes" in Step S1004), an error signal is output (Step 1006). On the contrary, when ΔC is less than V3 (i.e., "No" in Step S1004), the difference comparison section 703 judges whether ΔC is not greater than the fourth value V4 (Step S1005).

When ΔC is not greater than V4 (i.e., "Yes" in Step S1005), the difference comparison section 703 outputs an error signal (Step S1006). On the contrary, when ΔC is greater than V4 (i.e., "No" in Step S1005), the memory control section 602 judges whether the operation of outputting image data to the hard disk drive 605 is performed (Step S1007). When the image data outputting operation is not performed (i.e., "No" in Step S1007), it is judged whether the memory access permission signal should be output (Step S1012).

On the contrary, when the image data outputting operation is performed (i.e., "Yes" in Step S1007), it is judged whether ΔC is not less than V1 (Step S1008). When ΔC is not less than V1 (i.e., "Yes" in Step S1008), a transfer memory access mask signal is made to be active so as to stop an output of image data (Step S1010). When ΔC is not greater than v1 ("No" in Step S1008), it is judged whether ΔC is not less than v2 (Step S1009). When ΔC is not less than v2 ("Yes" in Step S1009), it is judged whether the memory access permission signal should be output without masking the transfer memory access signal (Step S1012).

In addition, when ΔC is less than V2 (i.e., "No" in Step S1009), the process of making the transfer demand mask signal active and the process of masking the transfer demand signal are continuously performed (Steps S1010 and S1011). When the transfer demand signal is input to the memory control section 602 without being masked, the memory control section 602 judges whether the condition such that the transfer access permission signal can be output according to the transfer access demand signal is satisfied (Step S1012).

When the condition is satisfied (i.e., "Yes" in Step S1012), the memory control section 602 outputs the transfer access permission signal (Step S1013). On the contrary, the condition is not satisfied (i.e., "No" in Step S1012), the input/output address counter 706 and the transfer image address counter 707 perform counting according to the process (Step S1014). Then the address selector 708 selects either the address of the input image or the address of the transfer image (Step S1015), and a signal for controlling the image memory 603 is output via control signal line (Step S1016).

Next, the image data outputting process will be explained referring to the flowchart as shown in FIG. 11. Since the processes in the flowchart in FIG. 11 include the processes that have been explained referring to FIG. 10, only the processes different from the processes in the flowchart in FIG. 10 will be hereinafter explained, and explanation of the similar processes will be sometimes omitted.

As shown in the flowchart in FIG. 11, when the image data are output, the memory control section 602 at first inputs an internal input line number C1', which represents the quantity of image data input by the hard disk drive 605 to the image memory 603 (Step S1101), and then outputs an external output line number C2', which represents the quantity of image data output from the image memory 603 to the image forming section 330 (Step S1102). Then a value ΔC' is determined by subtracting the external output line number C2' from the internal input line number C1' (Step S1103).

Then, the difference comparison section 703 judges whether ΔC' is not less than V7 (Step S1104). When ΔC' is not less than V7 (i.e., "Yes" in Step S1104), an error signal is output (Step 1106). On the contrary, when ΔC' is less than V7 (i.e., "No" in Step S1104), the difference comparison section judges whether ΔC' is not greater than the eighth value V8 (Step S1105).

When ΔC' is not greater than V8 (i.e., "Yes" in Step S1105), the difference comparison section 703 outputs an error signal (Step S1106). On the contrary, when ΔC' is greater than V8 (i.e., "No" in Step S1105), the memory control section 602 judges whether the operation of outputting image data to the hard disk drive 605 is performed (Step S1107). When the image data outputting operation is not performed (i.e., "No" in Step S1107), it is judged whether the memory access permission signal should be output (Step S1112).

On the contrary, when the image data outputting operation is performed to the hard disk drive 605 (i.e., "Yes" in Step S1107), it is judged whether ΔC' is not less than V5 (Step S1108). When ΔC' is not less than V5 (i.e., "Yes" in Step S1108), a transfer memory access mask signal is made to be active so as to stop an output of image data (Step S1110). When ΔC' is not greater than V5 ("No" in Step S1108), it is judged whether or not ΔC' is not less than V6 (Step S1109). When ΔC' is not less than V6 ("Yes" in Step S1109), it is judged whether the memory access permission signal should be output without masking the transfer access signal (Step S1112).

In addition, when ΔC' is less than V6 (i.e., "No" in Step S1109), the process of making the transfer demand mask signal active and the process of masking the transfer demand signal are continuously performed (Steps S1110 and S1111). When the transfer demand signal is input to the memory control section 602 without being masked, the memory control section 602 judges whether the condition such that the transfer access permission signal can be output according to the transfer access demand signal is satisfied (Step S1112).

The processes in Steps S1110 to S1116 are performed similarly to those in Steps S1010 to 1016 mentioned above with respect to FIG. 10.

According to the first embodiment mentioned above, the difference between the quantity of image data, which are input to the image memory 603, and the quantity of image data, which are output to the hard disk drive 605 from the image memory 603 is determined, and then the difference is compared with the four values, i.e., a first, second, third and fourth value. When the difference reaches a value not greater than the first value, the process in which image data are output from the image memory 603 to the hard disk drive 605 is stopped. When the difference reaches a value not less than the second value, the image data outputting process is started again. By performing this process, the image processing apparatus of the first embodiment can smoothly perform the process, in which image data input are transferred in the apparatus, when the image data are input.

When the difference reaches a value not less than the third value or a value not greater than the fourth value, an error signal is output to stop the system. By performing this process, the image processing apparatus of first embodiment can prevent the image data, which are stored in the image memory 603 but are not yet output to the hard disk 605, from being lost when the image data are input. In addition, system errors such as an error such that the data quantity difference is determined as a negative value can be detected.

Further, according to the first embodiment, the difference between the quantity of image data input from the hard disk drive 605 to the image memory 603 and the quantity of image data output from the image memory 603 to the outside is determined, and then the difference is compared with four values, i.e., a fifth, sixth, seventh and eighth value. When the difference reaches a value not greater than the fifth value, the process in which image data are output from the image memory 603 to the hard disk drive 605 is stopped. When the difference reaches a value not less than the sixth value, the image data outputting process is started again. By performing this process, the image processing apparatus of the first embodiment can smoothly perform the process, in which the image data transmitted from the inside of the apparatus are output to the outside, when image data are input.

When the difference reaches a value not less than the seventh value or a value not greater than the eighth value, an error signal is output to stop the system. By performing this process, the image processing apparatus of first embodiment can prevent the image data, which are stored in the image memory 603 but are not yet output to the outside, from being lost when the image data are output. In addition, system errors such as an error such that the data quantity difference is determined as a negative value can be detected.

Second Embodiment

Next, the second embodiment of the image processing apparatus of the present invention will be explained. The image processing apparatus of the second embodiment has a configuration similar to those of the image processing apparatus of the first embodiment and the image forming apparatus to which the image processing apparatus of the first embodiment is applied. Therefore, in the second embodiment, explanation or illustration of the devices similar to those in the first embodiment are omitted, and only the points different from the first embodiment will be hereinafter explained.

Figure 12:
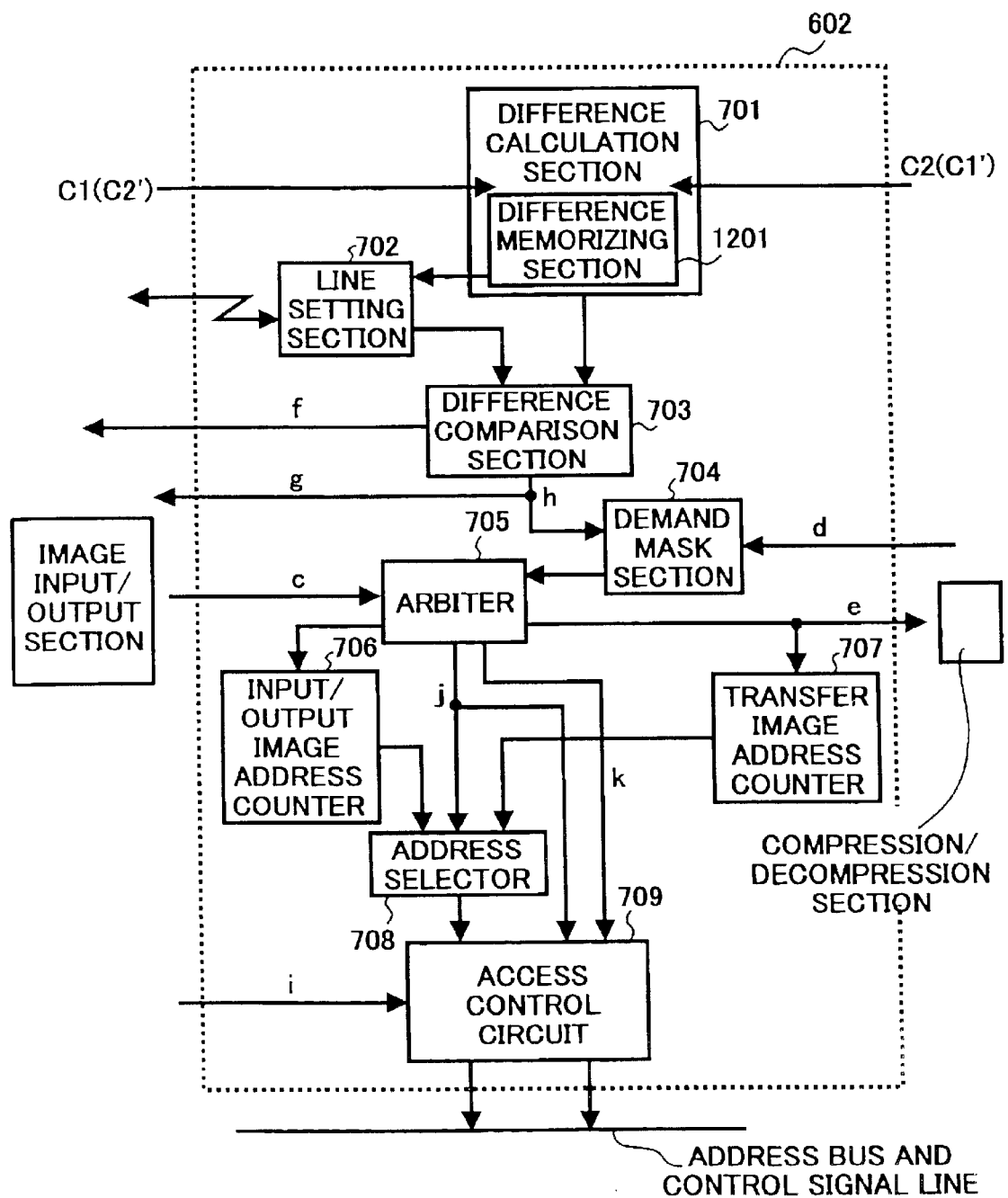
FIG. 12 explains a construction of an image processing apparatus according to a second embodiment of the present invention.

FIG. 12 is a view for explaining the configuration of the image processing apparatus of the second embodiment. As shown in FIG. 12, in the process in which image data are input to the image memory 603 and the image data are output from the image memory 603 to the hard disk drive 605, variation in the quantity of the image data stored in the image memory 603 is detected. The maximum value in the variation is recorded for each predetermined page, and the preliminarily-set third value is renewed according to the recorded maximum value.

Namely, the image processing apparatus of the second embodiment has a difference recording section 1201, which records in order the differences in line number between the external input line number C1 and the internal output line number C2, which are calculated by the difference calculation section 701. The difference recording section 1201 records the differences for each predetermined page, and outputs the differences to the line setting section 702. The line setting section 702 outputs the differences recorded by the difference recording section 1201 to the system control section 323.

The line number differences in each predetermined page change with a lapse of time. The system control section 323 detects a maximum value (hereinafter referred to as a maximum variation value) of the differences recorded for each predetermined page, and outputs the maximum variation value to the line setting section 702. The line setting section 702 outputs the maximum variation value input by the system control section 323 to the difference comparison section 703. The difference comparison section 703 sets the maximum variation value as a new third value. By performing the above-mentioned operations, the preliminarily-set third value is renewed with the maximum variation value when image data in each predetermined page are processed.

In addition, the difference recording section 1201 records in order the line number differences which are calculated by the difference calculation section 701, when the image processing apparatus outputs the image data from the image memory 602. The recorded line number differences are output to the line setting section 702. The line setting section 702 outputs the line number differences recorded by the difference recording section 1201 to the system control section 323. The system control section 323 sets the maximum variation value as a new third value by the same method as the method mentioned above in the image data inputting process.

FIGS. 13A to 13C are view for explaining the processes performed in the image processing apparatus of the second embodiment. Specifically, FIGS. 13A to 13C are view for explaining how the third value is renewed referring to a case in which image data are input from outside to the memory control section 602. FIG. 13A illustrates the total quantity of image data being access to the image memory 603 in the image input operation. FIGS. 13B and 13C illustrate the states of an accessed address in the image memory 603. The flows of image data indicated by image data A and image data B in FIGS. 13C to 13C correspond to the flows of image transfer indicated by A and B in FIG. 1, respectively.

The accessed address in the image memory 603 changes its state for example, from a state (b) to a state (c) with a lapse of time. In such a case, the image processing apparatus of the second embodiment detects a maximum value of the differences between the image data A and the image data B for the predetermined page. Then the third value (V3), which is preliminarily set, is substituted by this maximum value for use the value in the next image processing.

By performing the above-mentioned operations, the image memory 603 in the image processing apparatus of the second embodiment merely keeps an image storage memory space for preventing lost of image data due to overwriting. The residual space in the image memory 603 can be used for other processes. Therefore the image memory 603 can be efficiently used in the image processing apparatus of the second embodiment.

Figure 14:
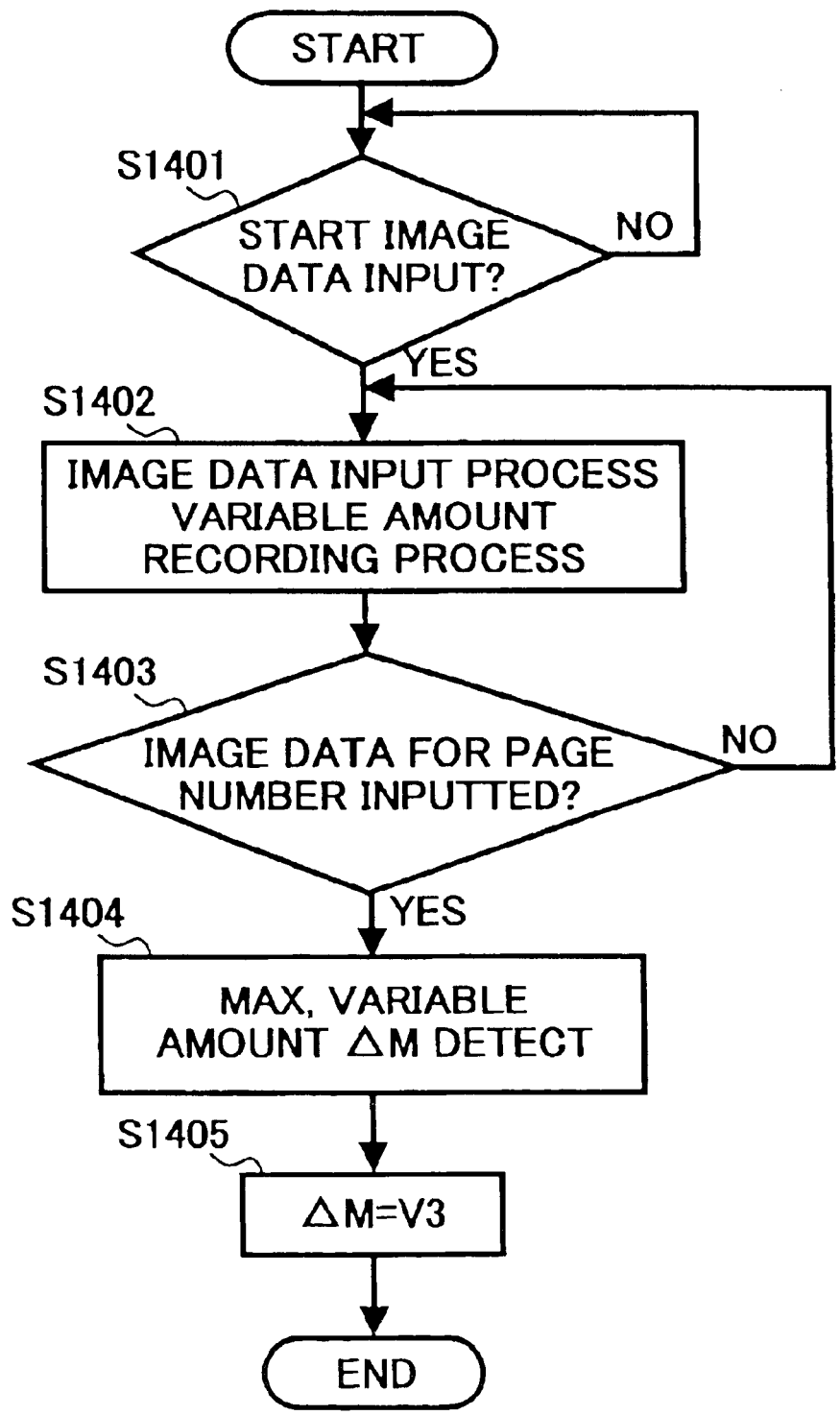
FIG. 14 explains operations according to the second embodiment of the present invention.

FIG. 14 is a flowchart for explaining the processes performed in the image processing apparatus of the second embodiment. In the image processing apparatus of the second embodiment, at first it is judged whether input of image data is started (Step S1401). When it is judged that the input of image data is started (i.e., "Yes" in Step 1401), the memory control section 602 performs the inputting process of inputting image data to the image memory while recording the variation in the image data in the image memory 603. When it is judged that the input of image data is not yet started (i.e., "No" in Step S1401), the memory control section 602 waits until the input of image data is started.

In addition, the memory control section 602 communicates with the system control section 323 to judge whether the image data of a predetermined page (i.e., the first page in the second embodiment) of an original are input to the hard disk drive 605 (Step S1403). When the image data of the predetermined page (i.e., the first page in the second embodiment) of the original is not yet input (i.e., "No" in Step S140), the image data inputting processes of from S1402 and S1403 are repeated.

When it is judged that all the image data of the predetermined page are finished in Step S1403, the system control section 323 detects a maximum value $\Delta M$ among the recorded image data (Step S1404). Then the line setting section 702 communicates with the system control section 323 to input the value $\Delta M$ as the line number of the image data. Then the preliminarily-set third value is renewed with the value $\Delta M$ (Step S1405). Thus, all the processes are finished.

Although a processing for inputting image data to an image memory from outside alone is described in the above-described second embodiment, the present invention is not limited to an image inputting processing, but includes processing for outputting image data to outside from an image memory.

Third Embodiment

Next, a third embodiment of the present invention will be described below. An image forming apparatus including an image processing apparatus of the third embodiment has the same constitution as for the image forming apparatus to which the image processing apparatus according to the first embodiment is applied. Therefore, a part of the image forming apparatus in diagrams and its partial description are omitted in the third embodiment.

Figure 15:
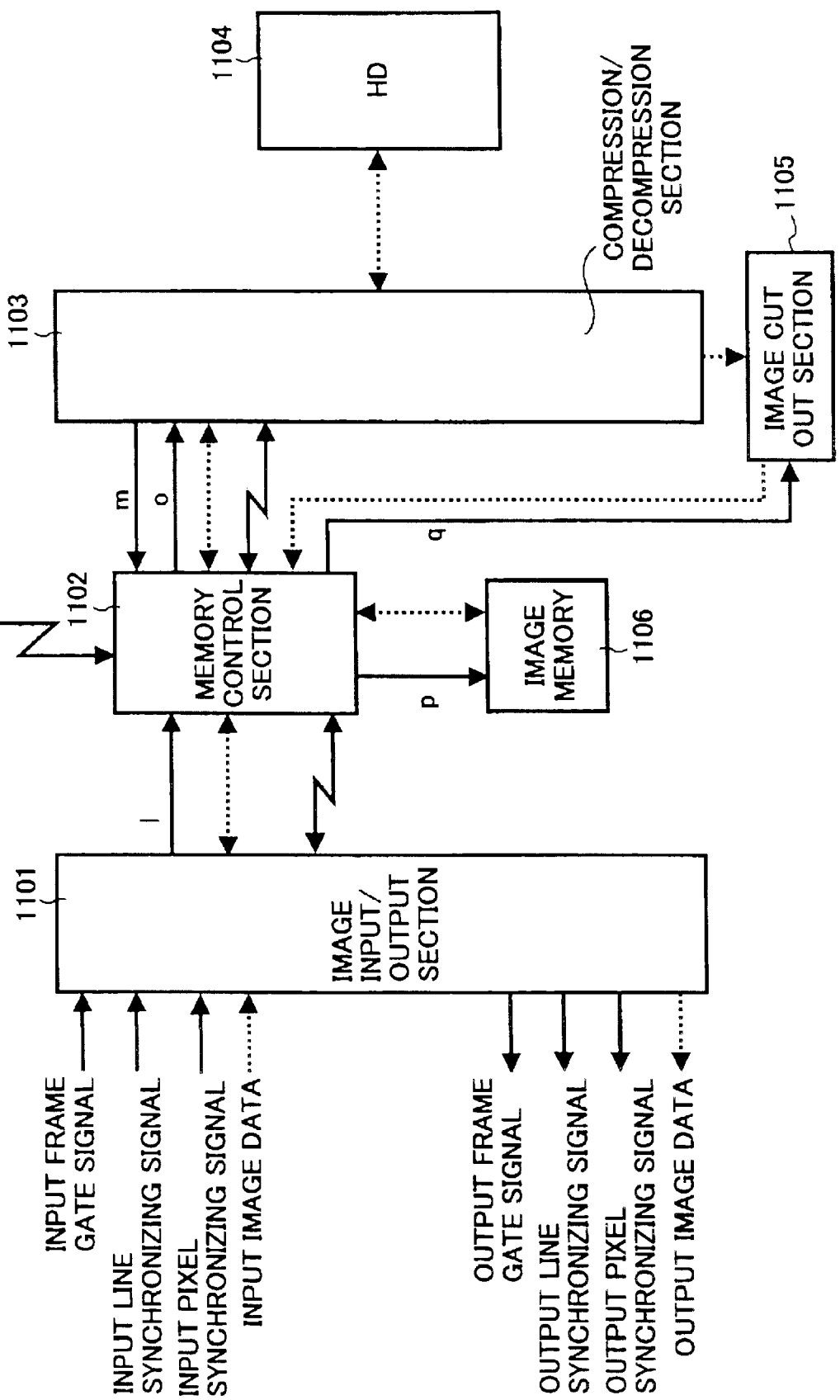
FIG. 15 is a block diagram showing a memory section of an image processing apparatus.

Referring to FIG. 15, there is shown a diagram explaining a memory section 322 of an image processing apparatus of the third embodiment. The memory section 322 of the image processing apparatus of the third embodiment stores image data, reads out the stored image data, and then outputs it with a line synchronizing signal.

The memory section 322 of the image processing apparatus of the third embodiment includes a hard disk drive (HD) 1104, which is a secondary memory device for storing image data, an image cut out section 1105 for cutting out the image data read out after being stored in the hard disk drive 1104 in a area corresponding to a predetermined area of an image formed on the basis of the read-out image data, an image memory 1106, which is a primary memory device into which the cut out image data is written, and a memory control section 1102 for controlling reading processing for reading out the image data from the hard disk drive 1104 and transferring processing for transferring the cut out image data to the image memory 1106. The secondary memory device is not limited to the hard disk, but it can be a magnetic disk unit such as a MO.

The memory section 322 of the image processing apparatus of the third embodiment further includes a compression and decompression section 1103 for compressing image data before being stored in the hard disk drive 1104 and decompressing image data read out from the hard disk drive 1104 and an image data decompressing section for decompressing image data read out from the primary memory device by the image data reading section.

The memory control section 1102 can change the range of the image data cut out by the image cut out section 1105 per units of the minimum image data amount that can be transferred. All of an image input/output section 1101, the memory control section 1102, the compression and decompression section 1103, and the image cut out section 1105 of the third embodiment include a CPU and a logic circuit.

In the above constitution, the memory control section 1102 communicates with a system control section 323 to receive commands from the system control section 323. The commands include commands related to an input or output of image data, commands related to compression or decompression, and commands related to cutting out and they are transmitted to each part of the memory section 322 according to each content.

Figure 16:
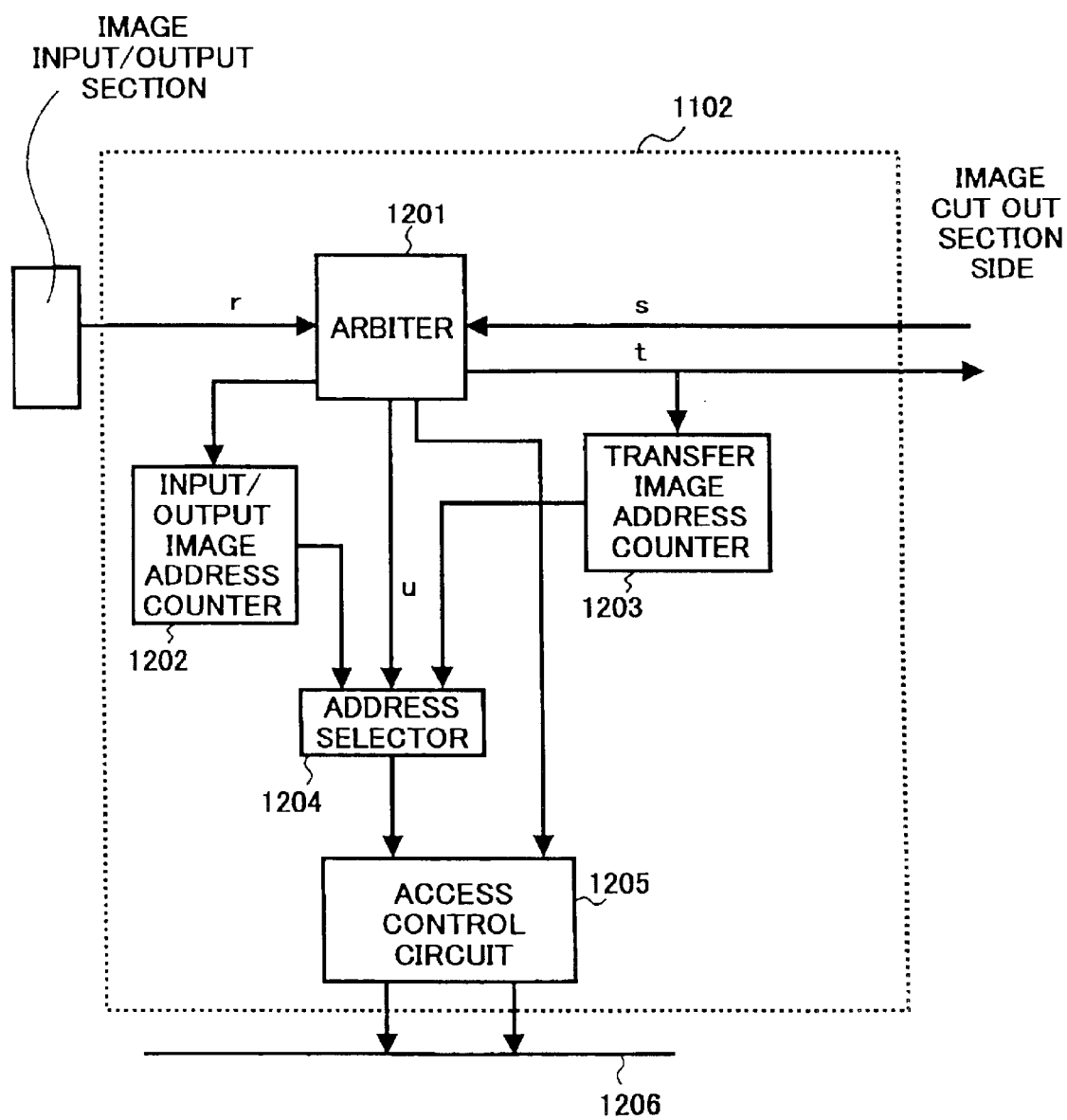
FIG. 16 explains a composition of a memory control section.

Referring to FIG. 16, there is shown a block diagram for explaining a constitution of the memory control section 1102. The memory control section 1102 includes an arbiter 705, an input/output image address counter 1202, a transfer image address counter 1203, an address selector 1204, and an access control circuit 1205.

The arbiter 1201 has a constitution for outputting a transfer access enabling signal "o". The arbiter 1201 outputs the transfer access enabling signal "o" when an input/output memory access signal "l" is non-active and a transfer memory access signal "m" is active.

The input/output image address counter 1202 is an address counter incremented in response to an input memory access signal "l" and outputs a memory address at which an input image data is stored in the image memory 1106. The transfer image address counter 1203 is an address counter incremented in response to a transfer access signal "m" and outputs a memory address at which the image data is stored in the hard disk drive 1104. Both of the input/output image address counter 1202 and the transfer image address counter 1203 are initialized once to a predetermined value at a start of a memory access.

The address selector 1204 is a selector for selecting one of the input/output image data and the transfer image data according to a signal "u" output by the arbiters 1201. The access control circuit 1205 divides an input physical address into a row address and a column address corresponding to a DRAM which is included in the image memory 1106 on the basis of a signal input from the address selector. Then, it outputs them to an 11-bit address bus 1206. In addition, the access control circuit outputs a DRAM control signals according to a signal input from the arbiter 1201.

The image input/output section 1101 communicates with the memory control section 1102 to receive commands from the memory control section 1102. Then, it operates according to a received command. In addition, it outputs status information for notifying an image data input/output state to the memory control section 1102.

When receiving an image input command from the memory control section 1102, the image input/output section 1101 outputs image data (input image data) input together with various synchronizing signals in units of 8 pixels with an input-output memory access signal "l". When receiving an image output command from the memory control section 1102, the image input/output section 110 outputs image data input via the memory control section 1102 with various synchronizing signals.

The compression and decompression section 1103 communicates with the memory control section 1102 to receive commands from the memory control section 1102 and operates according to a received command. In addition, it outputs status information for notifying an image data compression and decompression state to the memory control section 1102. When receiving a compression command, the compression and decompression section 1103 outputs a transfer memory access signal "m" for requesting the memory control section 1106 to transfer the decompressed image data.

When the compression and decompression section 1103 inputs a transfer memory access permission signal "o" from the memory control section 1102, decompressed image data is output to the image memory 1106 via the memory control section 1102. When receiving a compression command, the compression and decompression section 1103 outputs a transfer access request signal "m" and inputs image data via the memory control section 1102 if the transfer memory access permission signal "o" is active. Then, it compresses the input image data and stores it into the hard disk drive 1104.

In addition, the compression and decompression section 1103 communicates with the memory control section 1102 to give an instruction on cutting out the decompressed image data. At this time, the compression and decompression section 1103 outputs the decompressed image data to the image cut out section 1105. At this time, the memory control section 1102 outputs a control signal "q" to the image cut out section 1105 and gives an instruction on addresses of image data corresponding to a start point and an end point of the image to be cut out.

The image cut out section 1105 cuts out image data input from the compression and decompression section 1103 on the basis of the control signal input from the memory control section 1102. The cut out image data is input to the image memory 1106 via the memory control section 1102. In addition, the image cut out section 1105 communicates with the memory control section 1102 to output status information indicating an image data transfer processing state to the memory control section 1102.

The image memory 1106 includes a semiconductor memory element such as a DRAM. The image memory 1106 has a 2M-byte storage capacity so as to store binary image data having an A4 size at 400 dpi.

The image input/output section 1101 inputs image data from an IPU 312. At this time, the image data is input with various synchronizing signals shown in FIG. 5. The input image data is input to the compression and decompression section 1103 via the memory control section 1102 to be decompressed and then stored once into the hard disk drive (HD) 1104. In this operation, the image memory 1102 is used as a buffer.

The image processing apparatus according to the third embodiment has a function of image division. An operation for reading image data stored in the hard disk drive 1104 will be described below for an operation with an image division and an operation without an image division (a normal operation).

1. Normal Operation

If image data is read out to form an image in a normal operation, the image data is decompressed in the compression and decompression section 1103 and output to the image memory 1106 via the memory control section 1102. Then, it is stored in the image memory 1106 and input to a printer control section 345 via the image input/output section 1101.

2. Operation with Image Division

If the image division is executed, image data is decompressed in the compression and decompression section 1103 in the same manner as for the normal operation. For the image division, the memory control section 1102 communicates with the compression and decompression section 1103 and the image cut out section 1106 to enable a control signal for giving an instruction on image cutting-out processing. In addition, it specifies a size of an image to be cut out with the control signal "q" and a start point and an end point for the cutting.

The start point, the end point, and the image size are arbitrarily changeable per units of the minimum data amount of image data that can be transferred from the image cut out section 1105 to the image memory 1106.

The image cut out section 1105 divides the image data at addresses corresponding to the designated start and end points and outputs it to the image memory 1106 with the memory address "p" via the memory control section 1102. The designated image data is input to the image memory 1106 and stored at the address designated with the memory address "p". Additionally it is input to the printer control section 345 via the image input/output section 1101. An image forming section 330 forms an image based on the divided image data. As a result, an image is formed and is cut out at the start and end points designated with the control signal "q".

Figure 17A:
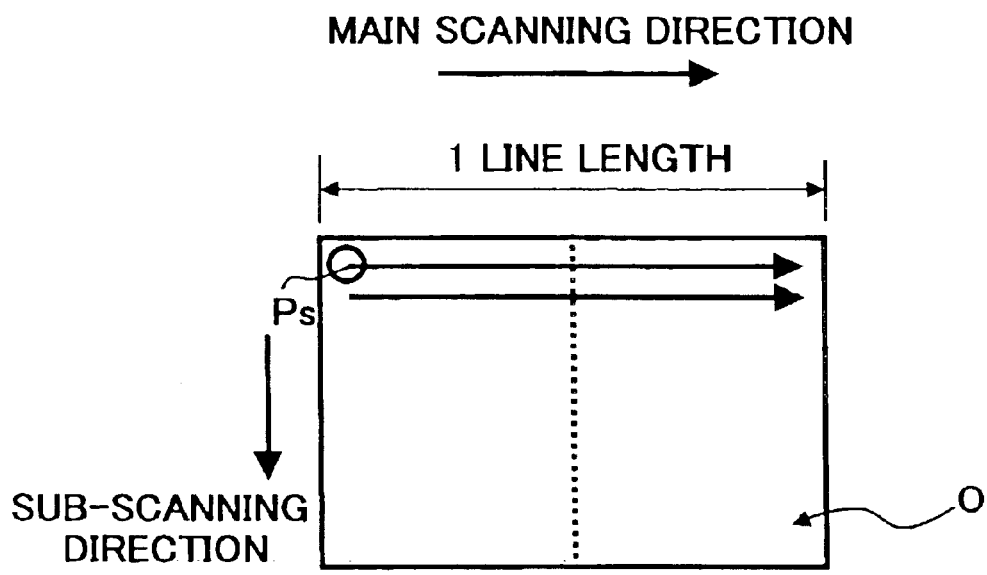
FIGS. 17A and 17B is a flow chart explaining a cut out image operation.
Figure 17B:
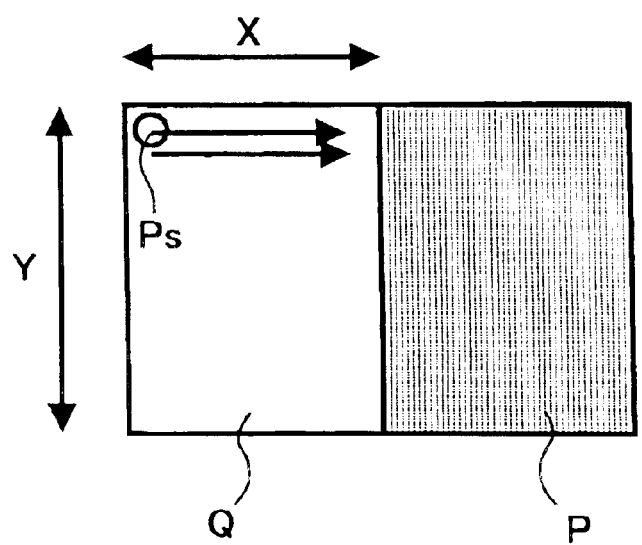

Referring to FIG. 17A and FIG. 17B, there are shown diagrams explaining a cut out image (divided image data). FIG. 17A schematically shows a state of the image data read from the hard disk drive 1104 and transferred to the image cut out section 1105. FIG. 17B schematically shows a state of the image data cut out in the image cut out section 1105 and transferred to the image memory 1106.

The image data read from the hard drive 1104 consists of lines starting at Ps as shown in FIG. 17A, with the line having a length of a single line in a main scanning direction. The image data shown in FIG. 17A is for forming an image of a sheet of an original document.

The image data cut out in the image cut out section 1105 is cut out as shown in FIG. 17B from the image data shown in FIG. 17A so as to cut out an image Q having a length X in the main scanning direction and a length Y in the sub-scanning direction from a sheet of a document image. At this point, the image P is discarded. In the third embodiment, the image data is cut out before being stored in the image memory 1106, and therefore the image memory need not have a capacity of storing a sheet of an original document, which is advantageous to downsize the image memory 1106.

Furthermore, the reduction of the capacity used for storing image data in the storage capacity of the image memory 1106 enables a storage capacity, which is not used for storing the image data, to be used for other processing (a rotation of an image, for example) so as to utilize the image memory 1106 effectively.

Figure 18:
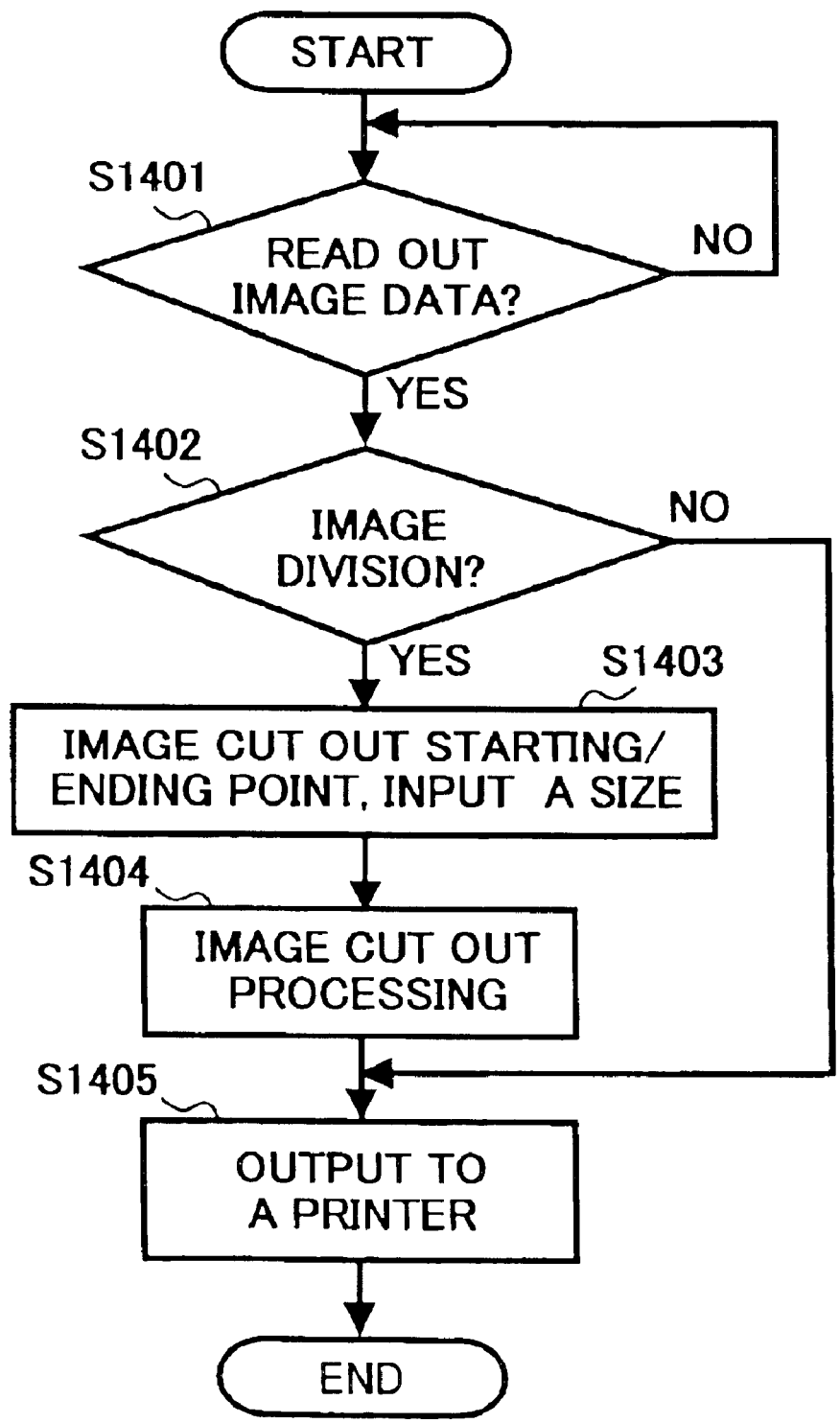
FIG. 18 is a flow chart explaining a processing of an image dividing.

Referring to FIG. 18, there is shown a flowchart explaining image division processing executed in the image processing apparatus according to the third embodiment. The image processing apparatus according to the third embodiment judges whether or not image data is requested to be read out (Step S1401). If the image data is judged to be requested to be read out (S1401: Yes), it is judged whether or not an image division is executed (Step S1402). The image cut out section 1105 inputs a start point, an end point, and a size of an image to be cut out from the memory control section 1102 (Step S1403) and executes the image cutting-out processing (Step S1404).

Then, the image data of the cut out image is transferred to the image memory 1106 and output to the printer and the processing is terminated. On the other hand, if the image data is judged not to be requested to be read out in step S1401 (S1401: No), the control is put in a standby state until a readout request is issued. If the image division is judged not to be executed in Step S1402 (S1402: No), the read image data is output to the printer without image division processing.

The mechanisms and processes set forth in the present description may be implemented using one or more conventional general purpose microprocessors programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a microprocessor to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

The present invention is not limited to the above embodiments. In other words, while the image processing apparatus of the present invention is a digital image forming apparatus in the first and third embodiments, the image processing apparatus of the present invention can be any of a printer, a copying machine, and a facsimile.

Numerous additional modifications and variations of the present invention are possible in light of the above teachings. It is therefore to be understood that within the scope of the appended claims, the present invention may be practiced otherwise than as specifically described herein.

The present invention claims priority and contains subject matter related to Japanese Patent Application Nos. 11-271330, filed on Sep. 24, 1999 and 2000-284293, filed on Sep. 19, 2000, and the entire contents of both of which are incorporated by reference herein.

What is claimed as new and is desired to be secured by Letters Patent of the United States is:

1. An image processing apparatus provided with a primary memory device and a secondary memory device both having image data memorized therein, in which said image data are input to said primary memory device, the apparatus comprising:
   an external input data amount acquisition device acquiring the amount of said image data input to said primary memory device;
   an internal output data amount acquisition device acquiring the amount of said image data output from said primary memory device and input to said secondary memory device;
   a first difference data amount calculation device subtracting the amount of the data acquired by said internal output data amount acquisition device from the amount of the data acquired by said external input data amount acquisition device, and calculating first difference data amount by the subtraction;
   a memory access control device practicing the inputting and outputting of said image data with time sharing in said primary memory device, comparing said first difference data amount with a first value and a second value larger than said first value, stopping the processing of outputting said image data from said primary memory device to said secondary memory device when said first difference data amount reaches the value equal to or smaller than said first value, and starting again the processing of outputting said image data from said primary memory device to said secondary memory device when said first difference data amount reaches the value equal to or larger than said second value; and
   an error signal outputting device comparing said first difference data amount with a third value larger than said second value and a fourth value smaller than said first value, and outputting an error signal when said first difference data amount reaches the value equal to or larger than said third value or when said first difference data amount reaches the value equal to or smaller than said fourth value.

2. The image processing apparatus as defined in claim 1, wherein said image processing apparatus further comprises:
   a variation amount recording device detecting the variation amount of said first difference data and recording the maximum value of said variation amount per unit of the predetermined pages number; and
   a set value renewal device renewing said third value previously set on the basis of the maximum value of the variation amount recorded by said variation amount recording device.

3. The image processing apparatus as defined in claim 1, wherein said primary memory device inputs and outputs in order said image data line by line with the method of raster; and
   wherein said external input data amount acquisition device and said internal output data amount acquisition device acquire the amount of said image data as the number of lines.

4. The image processing apparatus as defined in claim 2, wherein said primary memory device inputs and outputs in order said image data line by line with the method of raster; and
   wherein said external input data amount acquisition device and said internal output data amount acquisition device acquire the amount of said image data as the number of lines.

5. The image processing apparatus as defined in claim 1, wherein said image processing apparatus further comprises:
   an image data compression device compressing said image data before being memorized in said secondary memory device; and
   an image data decompression device decompressing said image data after being read out from said secondary memory device by said image data reading-out device.

6. The image processing apparatus as defined in claim 1, wherein said secondary memory device is a magnetic disc apparatus.

7. The image processing apparatus as defined in claim 1, wherein said primary memory device is a memory constructed with a semiconductor.

8. The image processing apparatus as defined in claim 1, wherein said memory access control device previously inputs said image data of the amount corresponding to said first value to said primary memory device from outside, prior to the outputting of said image data to said secondary memory device from said primary memory device.

9. The image processing apparatus as defined in claim 1, wherein said error signal outputting device outputs the error signal only during the time period of practicing the process of outputting said image data to said secondary memory device from said primary memory device.

10. The image processing apparatus as defined in claim 2, wherein said memory access control device previously inputs said image data of the amount corresponding to said first value to said primary memory device from outside, prior to the outputting of said image data to said secondary memory device from said primary memory device.

11. The image processing apparatus as defined in claim 2, wherein said error signal outputting device outputs the error signal only during the time period of practicing the process of outputting said image data to said secondary memory device from said primary memory device.

12. The image processing apparatus as defined in claim 3, wherein said memory access control device previously inputs said image data of the amount corresponding to said first value to said primary memory device from outside, prior to the outputting of said image data to said secondary memory device from said primary memory device.

13. The image processing apparatus as defined in claim 3, wherein said error signal outputting device outputs the error signal only during the time period of practicing the process of outputting said image data to said secondary memory device from said primary memory device.

14. The image processing apparatus as defined in claim 8, wherein said error signal outputting device outputs the error signal only during the time period of practicing the process of outputting said image data to said secondary memory device from said primary memory device.

15. An image processing apparatus provided with a primary memory device and a secondary memory device both having image data memorized therein, in which said image data are output to outside from said primary memory device, the apparatus comprising;
  an internal input data amount acquisition device acquiring the amount of said image data input to said primary memory device from said secondary memory device;
  an external output data amount acquisition device acquiring amount of said image data output to outside from said primary memory device;
  a second difference data amount calculation device subtracting the amount of the data acquired by said external output data amount acquisition device from the amount of the data acquired by said internal input data amount acquisition device, and calculating second difference data amount by the subtraction;
  a memory access control device practicing the inputting and outputting of said image data with time sharing in said primary memory device, comparing said second difference data amount with a fifth value and a sixth value larger than said fifth value, stopping the processing of outputting said image data from said primary memory device to said secondary memory device when said second difference data amount reaches the value equal to or larger than said fifth value, and starting again the processing of outputting said image data from said primary memory device to said secondary memory device when said second difference data amount reaches the value equal to or smaller than said sixth value; and
  an error signal outputting device comparing said second difference data amount with a seventh value larger than said sixth value and a eighth value smaller than said fifth value, and outputting an error signal when said second difference data amount reaches the value equal to or larger than said seventh value or when said second difference data amount reaches the value equal to or smaller than said eighth value.

16. The image processing apparatus as defined in claim 15, wherein said memory access control device previously inputs said image data of the amount corresponding to said fifth value to said primary memory device from said secondary memory device, prior to the outputting of said image data from said primary memory device.

17. The image processing apparatus as defined in claim 15, wherein said error signal outputting device outputs the error signal only during the time period of practicing the processing of outputting said image data to outside from said primary memory device.

18. The image processing apparatus as defined in claim 15, wherein said image processing apparatus further comprises:
  a variation amount recording device detecting the variation amount of said second difference data only during the time period of practicing the processing of outputting said image data from said primary memory device, and recording the maximum value of the variation amount per unit of the predetermined pages number; and
  a set value renewal device renewing said seventh value previously set on the basis of the maximum value of the variation amount recorded by said variation amount recording device.

19. The image processing apparatus as defined in claim 15, wherein said primary memory device inputs and outputs in order said image data with the method of raster; and
  wherein said internal input data amount acquisition device and said external output data amount acquisition device acquire the amount of said image data as the lines number.

20. The image processing apparatus as defined in claim 16, wherein said error signal outputting device outputs the error signal only during the time period of practicing the processing of outputting said image data to outside from said primary memory device.

21. The image processing apparatus as defined in claim 16, wherein said image processing apparatus further comprises:
  a variation amount recording device detecting the variation amount of said second difference data only during the time period of practicing the processing of outputting said image data from said primary memory device, and recording the maximum value of the variation amount per unit of the predetermined pages number; and
  a set value renewal device renewing said seventh value previously set on the basis of the maximum value of the variation amount recorded by said variation amount recording device.

22. The image processing apparatus as defined in claim 16, wherein said primary memory device inputs and outputs in order said image data with the method of raster; and
  wherein said internal input data amount acquisition device and said external output data amount acquisition device acquire the amount of said image data as the lines number.

23. The image processing apparatus as defined in claim 17, wherein said image processing apparatus further comprises:
- a variation amount recording device detecting the variation amount of said second difference data only during the time period of practicing the processing of outputting said image data from said primary memory device, and recording the maximum value of the variation amount per unit of the predetermined pages number; and
- a set value renewal device renewing said seventh value previously set on the basis of the maximum value of the variation amount recorded by said variation amount recording device.

24. The image processing apparatus as defined in claim 17, wherein said primary memory device inputs and outputs in order said image data with the method of raster; and
- wherein said internal input data amount acquisition device and said external output data amount acquisition device acquire the amount of said image data as the lines number.

25. The image processing apparatus as defined in claim 18, wherein said primary memory device inputs and outputs in order said image data with the method of raster; and
- wherein said internal input data amount acquisition device and said external output data amount acquisition device acquire the amount of said image data as the lines number.

26. An image processing method applicable to an image processing apparatus provided with a primary memory device and a secondary memory device both having image data memorized therein, in which said image data are input to said primary memory device from outside, the method comprising the steps of:
- an external input data amount acquisition process of acquiring the amount of said
- image data input to said primary memory device from outside;
- an internal output data amount acquisition process of acquiring the amount of said image data output from said primary memory device and input to said secondary memory device;
- a first difference data amount calculation process of subtracting the amount of the data acquired in said internal output data amount acquisition process from the amount of the data acquired in said external input data amount acquisition process, and calculating first difference data amount by the subtraction;
- a memory access control process of practicing the inputting and outputting of said image data with time sharing in said primary memory device, comparing said first difference data amount with a first value and a second value larger than said first value, stopping the processing of outputting said image data from said primary memory device to said secondary memory device when said first difference data amount reaches the value equal to or smaller than said first value, and starting again the processing of outputting said image data from said primary memory device to said secondary memory device when said first difference data amount reaches the value equal to or larger than said second value; and
- an error signal outputting process of comparing said first difference data amount with a third value larger than said second value and a fourth value smaller than said first value, and outputting an error signal when said first difference data amount reaches the value equal to or larger than said third value or when said first difference data amount reaches the value equal to or smaller than said fourth value.

27. The image processing method as defined in claim 26, further comprising the step of:
- a setting process of setting said first value, said second value, said third value, and said fourth value, all to be compared with said first difference data amount.

28. The image processing method as defined in claim 26, further comprising the steps of:
- a variation amount recording process of detecting the variation amount of said first difference data and recording the maximum value of said variation amount per unit of the predetermined pages number; and
- a set value changing process of changing said third value previously set on the basis of the maximum value of the variation amount recorded in said variation amount recording process.

29. The image processing method as defined in claim 26, wherein said primary memory device inputs and outputs in order said image data line by line with the method of raster; and
- wherein, in said external input data amount acquisition process and said internal output data amount acquisition process, the amount of said image data are acquired as the number of lines.

30. The image processing method as defined in claim 26, wherein said image processing method further comprises the steps of:
- an image data compression process of compressing said image data before memorizing said image data in said secondary memory device; and
- an image data decompression process of decompressing said image data after reading out said image data from said secondary memory device by said image data reading-out device.

31. The image processing method as defined in claim 26, wherein, in said memory access control process, said image data of the amount corresponding to said first value are previously input to said primary memory device from outside, prior to the outputting of said image data to said secondary memory device from said primary memory device.

32. The image processing method as defined in claim 26, wherein, in said error signal outputting process, the error signal is output only during the time period of practicing the process of outputting said image data to said secondary memory device from said primary memory device.

33. The image processing method as defined in claim 27, further comprising the steps of:
- a variation amount recording process of detecting the variation amount of said first difference data and recording the maximum value of said variation amount per unit of the predetermined pages number; and
- a set value changing process of changing said third value previously set on the basis of the maximum value of the variation amount recorded in said variation amount recording process.

34. The image processing method as defined in claim 28, wherein, in said memory access control process, said image data of the amount corresponding to said first value are previously input to said primary memory device from outside, prior to the outputting of said image data to said secondary memory device from said primary memory device.

35. The image processing method as defined in claim 28, wherein, in said error signal outputting process, the error signal is output only during the time period of practicing the process of outputting said image data to said secondary memory device from said primary memory device.

36. The image processing method as defined in claim 29, wherein, in said memory access control process, said image data of the amount corresponding to said first value are previously input to said primary memory device from outside, prior to the outputting of said image data to said secondary memory device from said primary memory device.

37. The image processing method as defined in claim 29, wherein, in said error signal outputting process, the error signal is output only during the time period of practicing the process of outputting said image data to said secondary memory device from said primary memory device.

38. The image processing method as defined in claim 31, wherein, in said error signal outputting process, the error signal is output only during the time period of practicing the process of outputting said image data to said secondary memory device from said primary memory device.

39. An image processing method applicable to an image processing apparatus provided with a primary memory device and a secondary memory device both having image data memorized therein, in which said image data are output to outside from said primary memory device, the method comprising the steps of:
an internal input data amount acquisition process of acquiring the amount of said image data input from said secondary memory device to said primary memory device;
an external output data amount acquisition process of acquiring the amount of said image data output from said primary memory device to outside;
a second difference data amount calculation process of subtracting the amount of the data acquired in said external output data amount acquisition process from the amount of the data acquired in said internal input data amount acquisition process, and calculating second difference data amount by the subtraction;
a memory access control process of practicing the inputting and outputting of said image data with time sharing in said primary memory device, comparing said second difference data amount with a fifth value and a sixth value larger than said fifth value, stopping the processing of outputting said image data from said primary memory device to said secondary memory device when said second difference data amount reaches the value equal to or larger than said fifth value, and starting again the processing of outputting said image data from said primary memory device to said secondary memory device when said second difference data amount reaches the value equal to or smaller than said sixth value; and
an error signal outputting process of comparing said second difference data amount with a seventh value larger than said sixth value and a eighth value smaller than said fifth value, and outputting an error signal when said second difference data amount reaches the value equal to or larger than said seventh value or when said second difference data amount reaches the value equal to or smaller than said eighth value.

40. The image processing method as defined in claim 39, wherein in said memory access control process, said image data of the amount corresponding to said fifth value are previously input to said primary memory device from said secondary memory device, prior to the outputting of said image data from said primary memory device.

41. The image processing method as defined in claim 39, wherein said error signal outputting process comprises:
a step of outputting said error signal only during the time period of practicing the process of outputting said image data from said primary memory device to outside.

42. The image processing method as defined in claim 39, comprising the steps of:
a variation amount recording process of detecting the variation amount of said second difference data only during the time period of practicing the process of outputting said image data from said primary memory device and recording the maximum value of said variation amount per unit of the predetermined pages number; and
a set value renewal process of renewing said seventh value previously set on the basis of the maximum value of the variation amount recorded in said variation amount recording process.

43. The image processing method as defined in claim 39, wherein said primary memory device inputs and outputs in order said image data line by line with the method of raster; and
wherein in said internal input data amount acquisition process and in said external output data amount acquisition process, the amount of said image data are acquired as the number of lines.

44. The image processing method as defined in claim 39, wherein said image processing method further comprises the steps of:
an image data compression process of compressing said image data before memorizing said image data in said secondary memory device; and
an image data decompression process of decompressing said image data after reading out said image data from said secondary memory device by said image data reading-out device.

45. The image processing method as defined in claim 40, wherein said error signal outputting process comprises:
a step of outputting said error signal only during the time period of practicing the process of outputting said image data from said primary memory device to outside.

46. The image processing method as defined in claim 40, comprising the steps of:
a variation amount recording process of detecting the variation amount of said second difference data only during the time period of practicing the process of outputting said image data from said primary memory device and recording the maximum value of said variation amount per unit of the predetermined pages number; and
a set value renewal process of renewing said seventh value previously set on the basis of the maximum value of said variation amount recorded in said variation amount recording process.

47. A computer readable recording medium for recording a program of causing a computer to practice an image processing method applicable to an image processing apparatus provided with a primary memory device and a secondary memory device both having image data memorized therein, in which said image data are input to said primary memory device from outside, wherein said computer readable recording medium records the program of causing said computer to practice the image processing method comprising the steps of:

- an external input data amount acquisition process of acquiring the amount of said image data input to said primary memory device from outside;
- an internal output data amount acquisition process of acquiring the amount of said image data output from said primary memory device and input to said secondary memory device;
- a first difference data amount calculation process of subtracting the amount of the data acquired in said internal output data amount acquisition process from the amount of the data acquired in said external input data amount acquisition process, and calculating first difference data amount by the subtraction;
- a memory access control process of practicing the inputting and outputting of said image data with time sharing in said primary memory device, comparing said first difference data amount with a first value and a second value larger than said first value, stopping the processing of outputting said image data from said primary memory device to said secondary memory device when said first difference data amount reaches the value equal to or smaller than said first value, and starting again the processing of outputting said image data from said primary memory device to said secondary memory device when said first difference data amount reaches the value equal to or larger than said second value; and
- an error signal outputting process of comparing said first difference data amount with a third value larger than said second value and a fourth value smaller than said first value, and outputting an error signal when said first difference data amount reaches the value equal to or larger than said third value or when said first difference data amount reaches the value equal to or smaller than said fourth value.

48. The computer readable recording medium as defined in claim 47, wherein said recording medium records the program of causing said computer to practice said image processing method further comprising the step of:

- a setting process of setting said first value, said second value, said third value, and said fourth value to be compared with said first difference data amount.

49. The computer readable recording medium as defined in claim 47, wherein said recording medium records the program of causing said computer to practice said image processing method further comprising the steps of:

- a variation amount recording process of detecting the variation amount of said first difference data and recording the maximum value of said variation amount per unit of the predetermined pages number; and
- a set value renewal process of renewing said third value previously set on the basis of the maximum value of said variation value recorded in said variation amount recording process.

50. The computer readable recording medium as defined in claim 47, wherein said recording medium records the program of causing said computer to practice said image processing method further comprising:

- wherein said primary memory device inputs and outputs in order said image data line by line with the method of raster; and
- wherein said external input data amount acquisition device and said internal output data amount acquisition device acquire the amount of said image data as the number of lines.

51. The computer readable recording medium as defined in claim 47, wherein said computer readable recording medium records the program of causing said computer to practice the image processing method further comprises the steps of:

- an image data compression process of compressing said image data before memorizing said image data in said secondary memory device; and
- an image data decompression process of decompressing said image data after reading out said image data from said secondary memory device by said image data reading-out device.

52. The computer readable recording medium as defined in claim 47, wherein, in said memory access control process, said recording medium records the program of causing said computer to practice the image processing method of previously inputting said image data of the amount corresponding to said first value to said primary memory device from outside, prior to the outputting of said image data to said secondary memory device from said primary memory device.

53. The computer readable recording medium as defined in claim 47, wherein, in said error signal outputting process, said recording medium records the program of causing said computer to practice the image processing method of outputting the error signal only during the time period of practicing the process of outputting said image data to said secondary memory device from said primary memory device.

54. The computer readable recording medium as defined in claim 48, wherein said recording medium records the program of causing said computer to practice said image processing method further comprising the steps of:

- a variation amount recording process of detecting the variation amount of said first difference data and recording the maximum value of said variation amount per unit of the predetermined pages number; and
- a set value renewal process of renewing said third value previously set on the basis of the maximum value of said variation value recorded in said variation amount recording process.

55. The computer readable recording medium as defined in claim 49, wherein, in said error signal outputting process, said recording medium records the program of causing said computer to practice the image processing method of outputting the error signal only during the time period of practicing the process of outputting said image data to said secondary memory device from said primary memory device.

56. The computer readable recording medium as defined in claim 49, wherein, in said memory access control process, said recording medium records the program of causing said computer to practice the image processing method of previously inputting said image data of the amount corresponding to said first value to said primary memory device from outside, prior to the outputting of said image data to said secondary memory device from said primary memory device.

57. The computer readable recording medium as defined in claim 50, wherein, in said memory access control process, said recording medium records the program of causing said computer to practice the image processing method of previously inputting said image data of the amount corresponding to said first value to said primary memory device from outside, prior to the outputting of said image data to said secondary memory device from said primary memory device.

58. The computer readable recording medium as defined in claim 50, wherein, in said error signal outputting process, said recording medium records the program of causing said computer to practice the image processing method of outputting the error signal only during the time period of practicing the process of outputting said image data to said secondary memory device from said primary memory device.

59. The computer readable recording medium as defined in claim 52, wherein, in said error signal outputting process, said recording medium records the program of causing said computer to practice the image processing method of outputting the error signal only during the time period of practicing the process of outputting said image data to said secondary memory device from said primary memory device.

60. A computer readable recording medium for recording a program of causing a computer to practice an image processing method applicable to an image processing apparatus provided with a primary memory device and a secondary memory device both having image data memorized therein, in which said image data are output to outside from said primary memory device, wherein said computer readable recording medium records the program of causing said computer to practice the image processing method comprising the steps of:
   an internal input data amount acquisition process of acquiring the amount of said image data input to said primary memory device from said secondary memory device;
   an external output data amount acquisition process of acquiring the amount of said image data output to outside from said primary memory device;
   a second difference data amount calculation process of subtracting the amount of the data acquired by said external output data amount acquisition device from the amount of the data acquired by said internal input data amount acquisition device, and calculating second difference data amount by the subtraction;
   a memory access control process of practicing the inputting and outputting of said image data with time sharing in said primary memory device, comparing said second difference data amount with a fifth value and a sixth value larger than said fifth value, stopping the processing of outputting said image data from said primary memory device to said secondary memory device when said second difference data amount reaches the value equal to or larger than said fifth value, and starting again the processing of outputting said image data from said primary memory device to said secondary memory device when said second difference data amount reaches the value equal to or smaller than said sixth value; and
   an error signal outputting process of comparing said second difference data amount with a seventh value larger than said sixth value and an eighth value smaller than said fifth value, and outputting an error signal when said second difference data amount reaches the value equal to or larger than said seventh value or when said second difference data amount reaches the value equal to or smaller than said eighth value.

61. The computer readable recording medium as defined in claim 60, wherein, in said memory access control process, said recording medium records the program of causing said computer to practice said image processing method of previously inputting said image data of the amount corresponding to said fifth value to said primary memory device from said secondary memory device, prior to the outputting of said image data from said primary memory device.

62. The computer readable recording medium as defined in claim 60, wherein, in said error signal outputting process, said recording medium records the program of causing said computer to practice said image processing method of outputting the error signal only during the time period of practicing the process of outputting said image data to outside from said primary memory device.

63. The computer readable recording medium as defined in claim 60, wherein said recording medium records the program of causing said computer to practice said image processing method further comprising the steps of:
   a variation amount recording process of detecting the variation amount of said second difference data only during the time period of practicing the process of outputting said image data from said primary memory device; and
   a set value renewal process of renewing said seventh value previously set on the basis of the maximum value of said variation amount recorded in said variation amount recording process.

64. The computer readable recording medium as defined in claim 60, wherein said recording medium records the program of causing said computer to practice the image processing method, in which said primary memory device inputs and outputs in order said image data line by line with the method of raster and the amount of said image data is acquired as the lines number in said internal input data amount acquisition process and in said external output data amount acquisition process.

65. The computer readable recording medium as defined in claim 61, wherein, in said error signal outputting process, said recording medium records the program of causing said computer to practice said image processing method of outputting the error signal only during the time period of practicing the process of outputting said image data to outside from said primary memory device.

* * * * *